US012479822B2

(12) United States Patent
Chauvigne-Hines et al.

(10) Patent No.: US 12,479,822 B2
(45) Date of Patent: Nov. 25, 2025

(54) AHR AGONISTS

(71) Applicant: Eli Lilly and Company, Indianapolis, IN (US)

(72) Inventors: Lacie Marie Chauvigne-Hines, Plainfield, IN (US); Christian Alexander Clarke, Fishers, IN (US); Douglas Linn Gernert, Fishers, IN (US); Steven James Green, Indianapolis, IN (US); Brian Morgan Watson, Carmel, IN (US)

(73) Assignee: ELI LILLY AND COMPANY, Indianapolis, IN (US)

( * ) Notice: Subject to any disclaimer, the term of this patent is extended or adjusted under 35 U.S.C. 154(b) by 0 days.

(21) Appl. No.: 17/943,554

(22) Filed: Sep. 13, 2022

(65) Prior Publication Data

US 2023/0159493 A1   May 25, 2023

Related U.S. Application Data

(60) Provisional application No. 63/261,794, filed on Sep. 29, 2021, provisional application No. 63/261,118, filed on Sep. 13, 2021.

(51) Int. Cl.
| | | |
|---|---|---|
| C07D 401/12 | (2006.01) | |
| C07D 215/54 | (2006.01) | |
| C07D 417/12 | (2006.01) | |
| C07D 471/04 | (2006.01) | |
| C07D 471/06 | (2006.01) | |

(52) U.S. Cl.
CPC ......... *C07D 401/12* (2013.01); *C07D 215/54* (2013.01); *C07D 417/12* (2013.01); *C07D 471/04* (2013.01); *C07D 471/06* (2013.01)

(58) Field of Classification Search
CPC .. C07D 401/12; C07D 471/04; C07D 471/06; C07D 417/12; C07D 215/54
See application file for complete search history.

(56) References Cited

U.S. PATENT DOCUMENTS

| | | | | |
|---|---|---|---|---|
| 7,199,147 B2 * | 4/2007 | Imazaki | ......... | A61P 13/08 |
| | | | | 548/362.5 |
| 9,179,678 B2 * | 11/2015 | Mitchell | ......... | A01N 43/90 |
| 2009/0325948 A1 | 12/2009 | Hurley et al. | | |
| 2021/0220408 A1* | 7/2021 | Boitano | ......... | A61K 31/44 |

FOREIGN PATENT DOCUMENTS

| | | | | |
|---|---|---|---|---|
| EP | 0059698 | | 9/1982 | |
| WO | 2001/30758 A1 | | 5/2001 | |
| WO | 2008/014307 | | 1/2008 | |
| WO | 2013/144231 A1 | | 10/2013 | |
| WO | WO-2014086737 A1 * | 6/2014 | ......... | C07D 401/12 |
| WO | WO-2015050379 A1 * | 4/2015 | ......... | A61K 31/4709 |

OTHER PUBLICATIONS

Targeting the Binding Function 3 (BF3) Site of the Human Androgen Receptor through Virtual Screening. Nathan A. Lack, et al. Journal of Medicinal Chemistry 2011 54 (24), 8563-8573. DOI: 10.1021/jm201098n (Year: 2011).*

Van Os NJH, Haaxma CA, van der Flier M, Merkus PJFM, van Deuren M, de Groot IJM, Loeffen J, van de Warrenburg BPC, Willemsen MAAP; A-T Study Group. Ataxia-telangiectasia: recommendations for multidisciplinary treatment. Dev Med Child Neurol. Jul. 2017;59(7):680-689. doi: 10.1111/dmcn.13424. (Year: 2017).*

Kitz A, Dominguez-Villar M. Molecular mechanisms underlying Th1-like Treg generation and function. Cell Mol Life Sci. Nov. 2017; 74(22):4059-4075. doi: 10.1007/s00018-017-2569-y. Epub Jun. 17, 2017. PMID: 28624966; PMCID: PMC7079789. (Year: 2017).*

Silverman. The Organic Chemistry of Drug Design . . . , Elsevier Academic Press, 2004, p. 24-34 (Year: 2004).*

Brown et al. Classical Bioisosteres Chp 2., Bioisosteres in Med Chem, Wiley-VCH Verlag Gmbh & Co. KGaA, 2012, p. 15-29 (Year: 2012).*

Dant et al. T-cell expression of AhR inhibits the maintenance of pTreg cells in the gastrointestinal tract in acute GVHD, Blood, 2017, p. 348-359 (Year: 2017).*

WO 2015050379, published 2015, Google Patent English translation (Year: 2015).*

Ehrlich, et al., "Is chronic AhR activation by rapidly metabolized ligands safe for the treatment of immune-mediated diseases?", Current Opinion in Toxicology, vol. 2, pp. 72-78 (2017).

Rothhammer, et al., "The aryl hydrocarbon receptor: an environmental sensor integrating immune responses in health and disease," Nat. Rev. Immunol., vol. 19, pp. 184-197 (2019).

Kerkvliet, et al., "Activation of aryl hydrocarbon receptor by TCDD prevents diabetes in NOD mice and increases Foxp3+ T cells in pancreatic lymph nodes," Immunotherapy, vol. 1, No. 4, pp. 539-547 (2009).

Quintana, et al., "Control of $T_{reg}$ and $T_H 17$ cell differentiation by the aryl hydrocarbon receptor," Nature, vol. 453, pp. 65-71 (2008).

Zhang, et al., Invest. Opthalmol. Vis. Sci., vol. 51, pp. 2109-2117 (2010).

Takamura, et al., "Activation of the aryl hydrocarbon receptor pathway may ameliorate dextran sodium sulfate-induced colitis in mice," Immunology and Cell Biology, vol. 88, pp. 685-689 (2010).

Benson, et al., "Aryl Hydrocarbon Receptor Activation by TCDD Reduces Inflammation Associated with Crohn's Disease," Toxicological Sciences, vol. 120, No. 1, pp. 68-78 (2010).

Singh, et al., "Activation of Aryl Hydrocarbon Receptor (AhR) Leads to Reciprocal Epigenetic Regulation of FoxP3 and IL-17 and Expression and Amelioration of Experimental Colitis," PLoS One, vol. 6, No. 8, p. e23522 (2011), Compound 1a-u.

(Continued)

*Primary Examiner* — Kortney L. Klinkel
*Assistant Examiner* — Richard Grant Peckham
(74) *Attorney, Agent, or Firm* — Jennifer Blount

(57) ABSTRACT

The present invention relates to certain substituted AHR agonist compounds, to pharmaceutical compositions comprising the compounds and to methods of using the compounds to treat immune-mediated diseases.

20 Claims, No Drawings

(56) References Cited

OTHER PUBLICATIONS

Pauly, et al., "The Aryl Hydrocarbon Receptor Influences Transplant Outcomes in Response to Environmental Signals," Toxicol. Environ. Chem., vol. 94, No. 6, pp. 1175-1187 (2012).

Schulz, et al., "Activation of the Aryl Hydrocarbon Receptor Suppresses Sensitization in a Mouse Peanut Allergy Model," Toxicological Sciences, vol. 123, No. 2, pp. 491-500 (2011).

Li, et al., "TCDD-Induced Activation of Aryl Hydrocarbon Receptor Inhibits Th17 Polarization and Regulates Non-Eosinophilic Airway Inflammation in Asthma," PLoS One, vol. 11, p. e0150551 (2016).

Luebke, et al., "Suppression of Allergic Immune Responses to House Dust Mite (HDM) in Rats Exposed to 2,3,7,8-TCDD," Toxicological Sciences, vol. 62, pp. 71-79 (2001).

Ukrainets, et al., "4-Hydroxy-2-quinolones. 95*. Synthesis, structure, and antitubercular properties of hetarylamides of 4-hydroxy-2-oxo-1,2,5,6,7,8-hexahydroquinoline-3-carboxylic acid," Chemistry of Heterocyclic Compounds, vol. 42, No., 6, pp. 765-775 (2006).

Manera Clementina et al: "Rational Design, Synthesis, and Pharmacological Properties of New 1,8-Napthyridin-2 (1 H)-on-3-Carboxamide Derivatives as Highly Selective Cannabinoid-2 Receptor Agonists", Journal of Medicinal Chemistry, vol. 52, No. 12 (2009).

Manera, Clementina et al: "New quinolone-and 1,8-naphthyridine-3-carboxamides as selective CB2 recpetor agonists with anticancer and immune-modulatory acti", European Journal of Medicinal Chemistry, Elsevier, Amsterdam, NL, vol. 97 (2015).

Lucchesi Valentina et al.: "CB2-Selective Cannabinoid Receptor Ligands: Synthesis, Pharmacological Evaluation, and Molecular Modeling Investigation of 1, 8-Naphthyridin-2 (1 H)-one-3-carboxamides", Journal of Medicinal Chemistry, vol. 57, No. 21 (2014).

* cited by examiner

AHR AGONISTS

The present invention relates to novel AHR agonist compounds, to pharmaceutical compositions comprising the compounds and to methods of using the compounds to treat certain physiological disorders.

The present invention is the field of treatment of certain immune-mediated diseases (IMD), in particular psoriasis, via the activation of the aryl hydrocarbon receptor (AHR).

IMDs encompass a broad range of chronic and debilitating inflammatory conditions that affect approximately 4% of the population worldwide. In view of the limited efficacy of currently available treatments, there is significant unmet need for potent, selective, and safe drugs for the treatment of IMDs.

AHR is a transcription factor which regulates many aspects of immunological function, most notably the suppression of adaptive immune responses (Ehrlich et al., *Curr. Opin. Toxicol.*, 2, 72-78 (2017)). Prototypical AHR agonists include halogenated dibenzodioxins, such as 2,3,7,8-tetrachlorodibenzodioxin (TCDD), tryptophan metabolites, such as L-kynurenine, bilirubin and PGE2. Results from studies on AHR agonists, especially TCDD, suggest that immune suppression occurs as the result of AHR-induced expression of regulatory T cells (Tregs), TH17 cells and dendritic cells (DCs) (Rothhammer et al., *Nat. Rev. Immunol.*, 19, 184-197 (2019)). TCDD has been shown to be effective in the prevention of several murine models of EID, including type-1 diabetes (Kerkvliet et al., *Immunotherapy*, 1, 539-547 (2009)), autoimmune encephalomyelitis (Quintana et al., *Nature*, 453, 65-71, (2008)), autoimmune uveoretinitis (Zhang et al., *Invest. Opthalmol. Vis. Sci.*, 51, 2109-2117 (2010)), inflammatory bowel disease (Takamura et al., *Immunol. Cell. Biol.*, 88, 685-689 (2010), Benson et al., *Toxicol. Sci.*, 120, 68-78 (2011), Singh et al., *PLoS One*, 6(8), e23522 (2011)), as well as several models of transplant tolerance (Pauly at al., *Toxicol. Environ. Chem.*, 94, 1175-1187 (2012)) and allergic diseases (Schulz et al., *Toxicol. Sci.*, 123, 491-500 (2011), Li et al, *PLoS One*, 11, e0150551 (2016), Luebke et al., *Toxicol. Sci.*, 62, 71-79 (2001)).

AHR also regulates the expression of CYP1A1, CYP1A2 and CYP1B1, which catalyze the metabolism of polycyclic aromatic hydrocarbon (PAH) and other aromatic compounds (e.g., estrogen). While in some cases (for example in the case of beno[a]pyrene) this metabolism results in the formation of reactive species, CYP induction is also believed to be critical for the detoxification and metabolic clearance of PAHs, which reduces the probability of bioactivation, and DNA adduct formation. Several marketed drugs were found to activate AHR (thus upregulating CYP1A1, CYP1A2 and CYP1B1) after their FDA approval, yet their long-term use is not associated with dioxin-like toxicities (Ehrlich et al., *Curr. Opin. Toxicol.*, 2, 72-78 (2017)). As such, CYP induction is no longer viewed as a barrier to the adoption of AHR agonists in therapy (Ehrlich et al., *Curr. Opin. Toxicol.*, 2, 72-78 (2017)).

The bacterial stilbenoid DMVT-505 (tapinarof) formulated as a 1% topical cream, is currently undergoing Phase 3 clinical trials for the treatment of plaque psoriasis in adults (NCT04053387). Despite this, there remains a need for novel oral, selective and potent AHR agonists for the treatment of IMDs.

WO 2008/014307 discloses certain bicyclic heteroaryl amides as inhibitors of undecaprenyl pyrophosphate synthase. EP 0059698 discloses certain heterocyclic carboxamides, compositions containing these compounds and methods of treatment with these compositions.

The present invention provides certain compounds that are agonists of AHR.

Accordingly, the present invention provides a compound of Formula I.

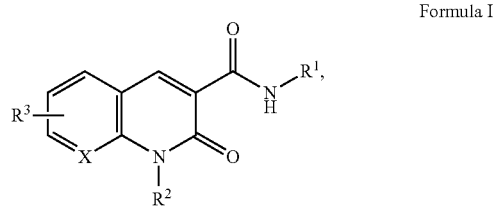

Formula I wherein, $R^1$ is selected from phenyl optionally substituted with 1-2 $R^i$, 5- to 6-membered heteroaryl optionally substituted with $R^k$ and $C_3$-$C_6$ cycloalkyl optionally substituted with $R^j$;

$R^i$ is independently selected from halogen, $C_1$-$C_4$ alkyl, $CF_3$, OH, O($C_1$-$C_4$ alkyl), O($C_1$-$C_3$)OCH$_3$ and NH($C_1$-$C_3$ alkyl)N(CH$_3$)$_2$;

$R^k$ is selected from halogen, $C_1$-$C_4$ alkyl, nitrile, $CF_3$ and O($C_1$-$C_4$ alkyl);

$R^j$ is O($C_1$-$C_4$ alkyl);

X is selected from N and —C($R^4$)—;

$R^2$ is $C_1$-$C_3$ alkyl, or together with $R^4$ it forms a 5- to 6-membered heterocyclic fused ring;

$R^4$ is hydrogen, halogen, NH($C_1$-$C_3$ alkyl)N(CH$_3$)$_2$ or together with $R^2$ it forms a 5- to 6-membered heterocyclic fused ring, $R^3$ is selected from hydrogen, halogen, $C_1$-$C_4$ alkyl, $C_3$-$C_6$ cycloalkyl, NH($C_1$-$C_3$ alkyl), N($C_1$-$C_3$ alkyl)$_2$, NH($C_1$-$C_3$ alkyl)OH, NH($C_1$-$C_3$ alkyl)N($C_1$-$C_3$ alkyl)$_2$ and O($C_1$-$C_3$ alkyl)OH;

or a pharmaceutically acceptable salt thereof.

The present invention also provides a compound of Formula I, wherein $R^1$ is 5- to 6-membered heteroaryl optionally substituted with $R^k$, or a pharmaceutically acceptable salt thereof.

The present invention further provides a compound of Formula I, wherein $R^1$ is 5- to 6-membered heteroaryl, or a pharmaceutically acceptable salt thereof.

The present invention also provides a compound of Formula I, wherein X is CH, or a pharmaceutically acceptable salt thereof.

The present invention provides a compound of Formula I, wherein $R^2$ is $C_1$-$C_3$ alkyl, or a pharmaceutically acceptable salt thereof.

The present invention further provides a compound of Formula I, wherein $R^2$ is CH$_3$, or a pharmaceutically acceptable salt thereof.

The present invention provides a compound of Formula I, wherein $R^3$ is selected from hydrogen, CH$_3$, NH(CH$_3$), N(CH$_3$)$_2$, N(CH$_2$CH$_2$)OH, N(CH$_2$CH$_2$)N(CH$_3$)$_2$ and O(CH$_2$CH$_2$)OH.

The present invention provides a compound of Formula I, wherein $R^3$ is selected from hydrogen and N(CH$_2$CH$_2$)N(CH$_3$)$_2$.

The present invention further provides a compound of Formula I, which is selected from:

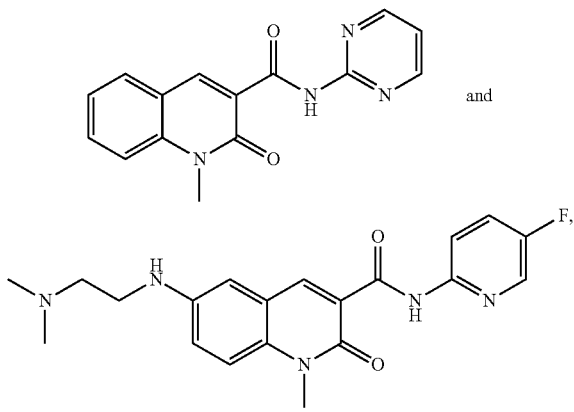

and or a pharmaceutically acceptable salt thereof.

The present invention also provides a compound of Formula I, which is selected from:

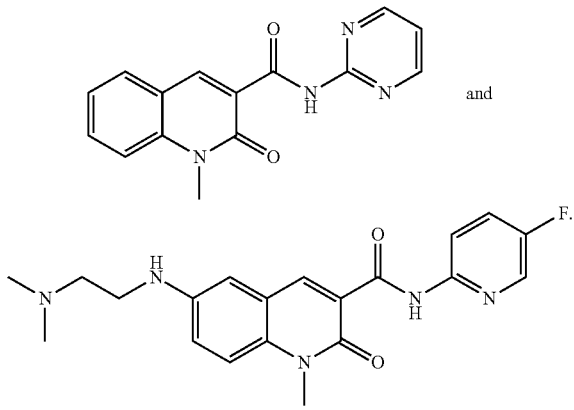

and

The present invention further provides pharmaceutical composition, comprising a compound or a pharmaceutically acceptable salt thereof according to any of the above embodiments with one or more pharmaceutically acceptable carriers, diluents, or excipients.

The present invention provides a method of treating an immune-mediated disease in a patient, comprising administering to a patient in need of such treatment an effective amount of a compound or pharmaceutical composition according to any of the above embodiments.

The present invention also provides a method of treating a disease or disorder selected from psoriasis, ulcerative colitis, Crohn's disease, graft-versus-host disease, and multiple sclerosis in a patient, comprising administering to a patient in need of such treatment an effective amount of a compound or pharmaceutical composition according to any of the above embodiments.

The present invention provides a compound according to any of the above embodiments, or a pharmaceutically acceptable salt thereof, for use in therapy.

The present invention also provides a compound according to any of the above embodiments, or a pharmaceutically acceptable salt thereof, for use in the treatment of a disease or disorder selected from psoriasis, ulcerative colitis, Crohn's disease, graft-versus-host disease, and multiple sclerosis.

Furthermore, the present invention provides a compound according to any of the above embodiments, or a pharmaceutically acceptable salt thereof, for the manufacture of a medicament for the treatment of an immune-mediated disease. In addition, the present invention provides a compound according to any of the above embodiments, or a pharmaceutically acceptable salt thereof, for the manufacture of a medicament for the treatment of a disease or disorder selected from psoriasis, ulcerative colitis, Crohn's disease, graft-versus-host disease, and multiple sclerosis.

As used herein, the term "alkyl", used alone or as part of a larger moiety, refers to a saturated, straight or branched chain hydrocarbon group containing one or more carbon atoms.

As used herein, the term "cycloalkyl" refers to a saturated ring system containing at least three carbon atoms. Exemplary monocyclic cycloalkyl rings include cyclopropyl, cyclobutyl, cyclopentyl, cyclohexyl, and cycloheptyl.

As used herein, the term "heterocyclic" refers to an optionally substituted saturated ring system containing at least two carbon atoms and at least one heteroatom. Exemplary heteroatoms are oxygen, nitrogen and sulfur. Exemplary heterocyclic rings include oxirane, aziridine, oxetane, oxolane, pyrrolidine, piperidine and morpholine.

As used herein, the term "heteroaryl" refers to groups having 5 to 10 ring atoms, preferably 5, 6, 9, or 10 ring atoms, having 6, 10, or 14 π-electrons shared in a cyclic array, and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, for example, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl and pyrazinyl. The term "bicyclic heteroaryl" includes groups in which a heteroaryl ring is fused to one more aryl, or heteroaryl rings. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl and quinoxalinyl.

As used herein, the term "immune-mediated disease" encompasses a group of autoimmune inflammatory disorders characterized by an alteration in cellular homeostasis. Immune-mediated diseases may be triggered by environmental factors, dietary habits, infectious agents, and genetic predisposition.

As used herein, the term "treating" includes restraining, slowing, stopping, or reversing the progression or severity of an existing symptom or disorder.

As used herein, the term "patient" refers to a human.

As used herein, the term "effective amount" refers to the amount or dose of compound of the invention, or a pharmaceutically acceptable salt thereof which, upon single or multiple dose administration to the patient, provides the desired effect in the patient under diagnosis or treatment.

An effective amount can be readily determined by one skilled in the art by the use of known techniques. In determining the effective amount for a patient, a number of factors are considered, including, but not limited to: the species of patient; its size, age, and general health; the specific disease or disorder involved; the degree of or involvement or the severity of the disease or disorder; the response of the individual patient; the particular compound administered; the mode of administration; the bioavailability characteristics of the preparation administered; the dose regimen selected; the use of concomitant medication; and other relevant circumstances.

The compounds of the present invention are generally effective over a wide dosage range. For example, dosages per day normally fall within the range of about 0.1 to about 15 mg/kg of body weight. In some instances, dosage levels below the lower limit of the aforesaid range may be more than adequate, while in other cases still larger doses may be employed with acceptable side effects, and therefore the above dosage range is not intended to limit the scope of the invention in any way.

The compounds of the present invention are preferably formulated as pharmaceutical compositions administered by any route which makes the compound bioavailable, including oral and transdermal routes. Most preferably, such compositions are for oral administration. Such pharmaceutical compositions and processes for preparing the same are well known in the art (See, e.g., Remington: The Science and Practice of Pharmacy, A. Adejare, Editor, 23$^{rd}$ Edition, Elsevier Academic Press, 2020).

The compounds of the present invention, or pharmaceutically acceptable salts thereof, may be prepared according to the following Preparations and Examples by methods well known and appreciated in the art. Suitable reaction conditions for the steps of these Preparations and Examples are well known in the art and appropriate substitutions of solvents and co-reagents are within the skill of the art. Likewise, it will be appreciated by those skilled in the art that synthetic intermediates may be isolated and/or purified by various well-known techniques as needed or desired, and that frequently, it will be possible to use various intermediates directly in subsequent synthetic steps with little or no purification. As an illustration, compounds of the preparations and examples can be isolated, for example, by silica gel purification, isolated directly by filtration, or crystallization. Furthermore, the skilled artisan will appreciate that in some circumstances, the order in which moieties are introduced is not critical. The particular order of steps required to produce the compounds of the present invention is dependent upon the particular compound being synthesized, the starting compound, and the relative liability of the substituted moieties, and is well appreciated by the skilled chemist. All substituents, unless otherwise indicated, are as previously defined, and all reagents are well known and appreciated in the art.

Certain abbreviations are defined as follows: "BrettPhos Pd G3" refers to [(2-di-cyclohexylphosphino-3,6-dimethoxy-2',4',6'-triisopropyl-1,1'-biphenyl)-2-(2'-amino-1,1'-biphenyl)]palladium(II) methanesulfonate; "BSA" refers to bovine serum albumin; "DIEA" refers to N,N-Diisopropylethylamine; "DMEM" refers to Dulbecco's modified eagle medium; "DMSO" refers to dimethyl sulfoxide; "DPBS" refers to Dulbecco's phosphate-buffered saline; "EGFP" refers to enhanced green fluorescent protein; "Et$_2$O" stands for diethyl ether; "EtOH" stands for ethyl alcohol; HATU refers to (1-[bis(dimethylamino)methylene]-1H-1,2,3-triazolo[4,5-b]pyridinium 3-oxide hexafluorophosphate "hr." or "hrs." refers to hour or hours; "min" refers to minute or minutes; "Pd$_2$(dba)$_3$" refers to tris(dibenzylideneacetone) dipalladium(0); "SCX" refers to strong cation exchange; "TBAF" refers to tetra-n-butylammonium fluoride; "tBuONa" refers to sodium tert-butoxide; "THF" refers to tetrahydrofuran; and "tBuXphos" refers to 2-di-tert-butylphosphino-2',4',6'-triisopropylbiphenyl.

In an optional step, a pharmaceutically acceptable salt of a compound according to any of the above embodiments can be formed by reaction of an appropriate free base of the compound with an appropriate pharmaceutically acceptable acid in a suitable solvent under standard conditions. The formation of such salts is well known and appreciated in the art. See, for example, Gould, P. L., "Salt selection for basic drugs," International Journal of Pharmaceutics, 33: 201-217 (1986); Bastin, R. J., et al. "Salt Selection and Optimization Procedures for Pharmaceutical New Chemical Entities," Organic Process Research and Development, 4: 427-435 (2000); and Berge, S. M., et al., "Pharmaceutical Salts," Journal of Pharmaceutical Sciences, 66: 1-19, (1977). "Salt selection for basic drugs," International Journal of Pharmaceutics, 33: 201-217 (1986). One of ordinary skill in the art will appreciate that a compound according to any of the above embodiments is readily converted to and may be isolated as a pharmaceutically acceptable salt.

The compounds of Formula I or pharmaceutically acceptable salts thereof, may be prepared by a variety of procedures known in the art, some of which are illustrated in the Schemes, Preparations, and Examples below. The specific synthetic steps for each of the routes described may be combined in different ways, or in conjunction with steps from different schemes, to prepare compounds of Formula I, or pharmaceutically acceptable salts thereof. The products of each step in the scheme below can be recovered by conventional methods well known in the art, including extraction, evaporation, precipitation, chromatography, filtration, trituration, and crystallization. In the scheme below, all substituents unless otherwise indicated, are as previously defined. The reagents and starting materials are readily available to one of ordinary skill in the art.

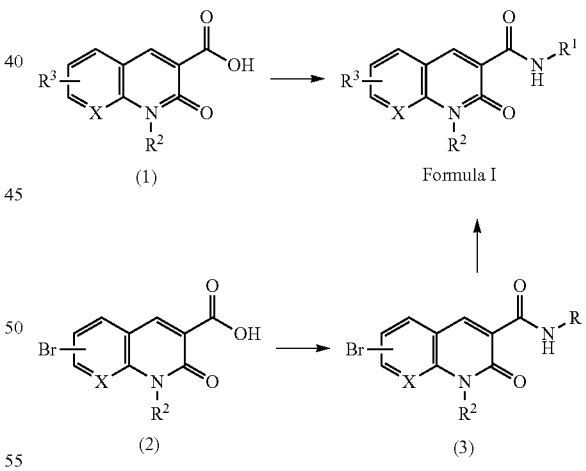

Scheme 1. General scheme for the preparation of compounds of Formula I

Scheme 1 depicts a general scheme for the synthesis of compounds of Formula I.

Fused 2-oxo-1H-pyridine-3-carboxylic acid (1) can be subjected to an amide coupling to give to give a compound of Formula I.

Alternatively, bromo-substituted fused 2-oxo-1H-pyridine-3-carboxylic acid (2) can be first subjected to an amide coupling to give (2), which can then undergo a palladium-catalyzed coupling reaction to give compounds of Formula I.

PREPARATIONS AND EXAMPLES

The following Preparations and Examples further illustrate the invention.

Intermediate 1

1-Methyl-2-oxo-1,8-naphthyridine-3-carboxylic acid

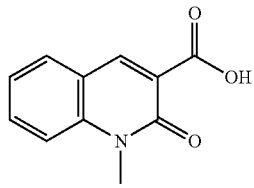

Step A: A mixture of 2-amino-3-pyridinecarboxaldehyde (500 mg, 3.972 mmol), diethyl malonate (6 mL, 39.48 mmol) and piperidine (1.6 mL, 16 mmol) is stirred in EtOH (7 mL, 120 mmol) for 1 hr. at ambient temperature. The mixture is refluxed for 2 hrs., and the precipitate collected by filtration. The solids are washed with cold EtOH and dried under vacuum to give ethyl 2-oxo-1H-1,8-naphthyridine-3-carboxylate (710 mg, 3.254 mmol, 81.93%) ES/MS (m/z): 219.0 (M+H). $^1$H NMR (400 MHz, d6-DMSO): 12.40 (s, 1H), 8.61 (dd, J=1.8, 4.7 Hz, 1H), 8.50 (s, 1H), 8.28 (dd, J=1.8, 7.8 Hz, 1H), 7.30 (dd, J=4.7, 7.8 Hz, 1H), 4.29 (q, J=7.1 Hz, 2H), 3.33 (s, 1H), 1.31 (t, J=7.1 Hz, 4H).

Step B: Iodomethane (0.61 mL, 9.8 mmol) and potassium carbonate (372 mg, 2.69167 mmol) are added to a suspension of ethyl 2-oxo-1H-1,8-naphthyridine-3-carboxylate (710 mg, 3.254 mmol) in EtOH (8 mL, 198 mmol) and N,N-dimethylformamide (8 mL, 103 mmol). The mixture is stirred overnight at ambient temperature, then diluted with ethyl acetate. The quenched reaction is washed sequentially with saturated aqueous sodium bicarbonate, and brine, dried with anhydrous sodium sulfate and filtered off. The filtrate is concentrated in vacuo. The residue is purified by silica gel chromatography to give ethyl 1-methyl-2-oxo-1,8-naphthyridine-3-carboxylate (648 mg, 2.7344 mmol, 84.039% Yield). ES/MS (m/z): 233.0 (M+H). $^1$H NMR (400 MHz, d6-DMSO): 8.75 (dd, J=1.9, 4.8 Hz, 1H), 8.51 (s, 1H), 8.35 (dd, J=1.9, 7.7 Hz, 1H), 7.39 (dd, J=4.7, 7.8 Hz, 1H), 4.31 (q, J=7.1 Hz, 2H), 3.70 (s, 3H), 1.32 (t, J=7.1 Hz, 3H).

Step C: Intermediate 1: Ethyl 1-methyl-2-oxo-1,8-naphthyridine-3-carboxylate (648 mg, 2.734 mmol) is dissolved in a mixture of THF (0.2M, 168 mmol) and methanol (10.94 mmol). 1M aqueous solution of lithium hydroxide (10.94 mmol) is added, and the reaction stirred overnight at ambient temperature. The reaction is concentrated to dryness then dissolved in water and pH adjusted to 1 with 1M aqueous solution of HCl. The white solid is filtered off and dried under house vacuum overnight to give the titular product (532 mg, 2.606 mmol, 95.287%). $^1$H NMR (400 MHz, d6-DMSO): 8.94 (s, 1H), 8.88 (dd, J=1.9, 4.7 Hz, 1H), 8.54 (dd, J=1.9, 7.8 Hz, 1H), 7.54 (dd, J=4.7, 7.8 Hz, 1H), 3.83 (s, 3H).

Intermediate 2

Ethyl 7-bromo-1-methyl-2-oxo-quinoline-3-carboxylate

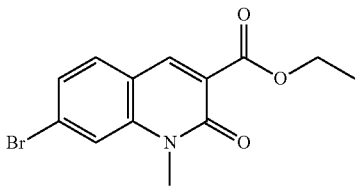 [SMILES: CCOC(=O)c1cc2ccc(Br)cc2n(C)c1=O]

Step A: A mixture of 2-amino-4-bromobenzaldehyde (3.0 g, 15 mmol), diethyl malonate (22 mL, 144.8 mmol) and piperidine (5.8 mL, 59 mmol) is refluxed in EtOH (40 mL, 687 mmol) for 3 hrs. The reaction is cooled to ambient temperature, filtered, rinsing the solids with cold EtOH followed by Et$_2$O to give the ethyl 7-bromo-2-oxo-1H-quinoline-3-carboxylate (Step A; 2.71 g, 9.14 mmol, 62%). ES/MS (m/z) ($^{79}$Br/$^{81}$Br): 297.0/298.0 (M+H). $^1$H NMR (400 MHz, d6-DMSO): 12.07 (bs, 1H), 8.49 (s, 1H), 7.78 (d, J=8.5 Hz, 1H), 7.50 (d, J=1.9 Hz, 1H), 7.40 (dd, J=1.9, 8.4 Hz, 1H), 4.27 (q, J=7.1 Hz, 2H), 1.30 (t, J=7.1 Hz, 3H).

Step B; Intermediate 2: Ethyl 7-bromo-2-oxo-1H-quinoline-3-carboxylate (2.707 g, 9.142 mmol) is dissolved in N,N-dimethylformamide (30 mL, 388 mmol, 28.4 g). Potassium carbonate (2.78 g, 20.1 mmol) is added followed by iodomethane (1.25 mL, 20.1 mmol, 2.85 g), and stirred at ambient temperature overnight. The reaction is poured into saturated aqueous sodium bicarbonate, and the resulting mixture extracted with ethyl acetate (3×). The organic layers are combined and washed with brine, dried over anhydrous magnesium sulfate, filtered, and concentrated in vacuo. The resulting material is purified by silica gel chromatography eluting with 0-100% ethyl acetate/hexanes gradient to give the titular product (2.58 g, 8.32 mmol, 91.0%). ES/MS (m/z) ($^{79}$Br/$^{81}$Br): 310.0/311.0 (M+H). $^1$H NMR (399.80 MHz, DMSO): 8.46 (s, 1H), 7.83 (d, J=8.4 Hz, 1H), 7.79 (d, J=1.7 Hz, 1H), 7.51 (dd, J=1.8, 8.4 Hz, 1H), 4.28 (q, J=7.1 Hz, 2H), 3.62 (s, 3H), 1.30 (t, J=7.1 Hz, 3H).

Intermediate 3

5-Bromo-1-methyl-2-oxo-quinoline-3-carboxylic acid

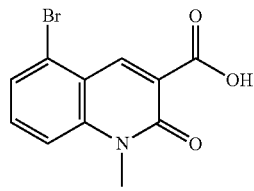 [SMILES: Cn1c(=O)c(C(=O)O)cc2c(Br)cccc21]

Step A: Diethyl malonate (696 mg, 4.345 mmol) and potassium carbonate (910 mg, 6.519 mmol) are added to a solution of 2-bromo-6-nitro-benzaldehyde (1 g, 4.347 mmol) in acetic anhydride (10 mL). The mixture is stirred at 806185 for 1 hr. The reaction is cooled to ambient temperature and diluted with water (20 mL) and extracted with dichloromethane (20 mL×3). The organic layers are combined, dried over anhydrous sodium sulfate, filtered, and concentrated in vacuo to give the diethyl 2-[(2-bromo-6-nitro-phenyl)methylene]propanedioate (1.6 g, 4.3 mmol, 99%). ES/MS (m/z) ($^{79}$Br/$^{81}$Br): 370.0/372.0 (M+H).

Step B: Iron (2.4 g, 37 mmol) is added to a solution of diethyl 2-[(2-bromo-6-nitro-phenyl) methylene]propanedioate (1.6 g, 4.3 mmol) in glacial acetic acid (10 mL). The reaction mixture is stirred at 80° C. for 12 hrs., then filtered through a pad of celite. The pH is adjusted to pH=8 with saturated aqueous sodium bicarbonate. The reaction is extracted with dichloromethane (50 mL×3). The combined organic layers with are washed with brine (30 mL×2), dried over anhydrous sodium sulfate, and concentrated in vacuo. The crude product is triturated with methanol at ambient temperature for 20 min, then filtered to give the ethyl 5-bromo-2-oxo-1H-quinoline-3-carboxylate (200 mg, 0.540 mmol, 50.28%). ES/MS (m/z) ($^{79}$Br/$^{81}$Br): 295.0/298.0 (M+H).

Step C: Cesium carbonate (573 mg, 1.76 mmol) and iodomethane (0.3 mL, 5 mmol) are added to a solution of ethyl 5-bromo-2-oxo-1H-quinoline-3-carboxylate (400 mg, 0.946 mmol) in dimethylformamide (10 mL). The resulting mixture is stirred at 50° C. for 12 hrs. The reaction mixture is quenched with water (10 mL) and extracted with dichloromethane (15 mL×3). The organic layers are combined, washed with brine (10 mL), dried over anhydrous sodium sulfate, filtered, and concentrated in vacuo to give a residue. The residue is purified with silica gel chromatography eluting with 0~40% ethyl acetate/petroleum ether gradient to give ethyl 5-bromo-1-methyl-2-oxo-quinoline-3-carboxylate (150 mg, 0.339 mmol, 100%). ES/MS (m/z) ($^{79}$Br/$^{81}$Br): 310.0/312.0 (M+H).

Step D; Intermediate 3: Lithium hydroxide (40 mg, 0.934 mmol) in water (2 mL) is added to a solution of ethyl 5-bromo-1-methyl-2-oxo-quinoline-3-carboxylate (100 mg, 0.323 mmol) in THF (2 mL). The resulting mixture is stirred at 40° C. for 1 hr. The mixture is cooled to ambient temperature and pH adjusted to pH 4 with 1 N aqueous HCl. The mixture is diluted with water (5 mL) and extracted with dichloromethane (10 mL×3). The combined organic layers are washed with brine (10 mL), dried over anhydrous sodium sulfate, and concentrated in vacuo to give the titular product (70 mg, 0.248 mmol, 77%). 11H NMR (400.13 MHz, d6-DMSO): 14.91-14.86 (m, 1H), 8.94 (s, 1H), 7.84-7.76 (m, 3H), 3.80 (s, 3H).

Example 1

N-(4-Methoxyphenyl)-1-methyl-2-oxo-quinoline-3-carboxamide

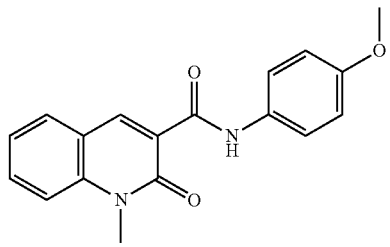 [SMILES: COc1ccc(NC(=O)c2cc3ccccc3n(C)c2=O)cc1]

1-Methyl-2-oxo-quinoline-3-carboxylic acid (418 mg, 2.057 mmol), 4-methoxyaniline (304 mg, 2.469 mmol), N,N-dimethylformamide (7 mL, 90.5 mmol), HATU (880 mg, 2.268 mmol) and N,N-diisopropylethylamine (1.8 mL, 10 mmol, 100) are added together. The reaction is stirred overnight at ambient temperature, and concentrated. The resulting material is purified by silica gel chromatography eluting with 0-5% dichloromethane/methanol gradient. The resulting solids are triturated with Et$_2$O to give the titular product (548 mg, 1.777 mmol, 86.40%). ES/MS (m/z): 309.0 (M+H). $^1$H NMR (400.13 MHz, d6-DMSO): 11.99 (s, 1H), 8.98 (s, 1H), 8.09 (dd, J=1.3, 7.9 Hz, 1H), 7.86-7.81 (in, 1H), 7.74-7.67 (m, 3H), 7.46-7.42 (in, 1H), 6.98-6.95 (m, 2H), 3.81 (s, 3H), 3.77 (s, 3H).

The following examples in Table 1 are synthesized essentially as described for N-(4-methoxyphenyl)-1-methyl-2-oxo-quinoline-3-carboxamide (Example 1) using the appropriate starting material and reagents.

TABLE 1

| | Examples 2-39 | | |
|---|---|---|---|
| Ex. | Chemical Name | Structure | ES/MS (m/z) (M + H) |
| 2 | N-(2-Hydroxyphenyl)-1-methyl-2-oxo-quinoline-3-carboxamide | | 295.0 |

TABLE 1-continued

Examples 2-39

| Ex. | Chemical Name | Structure | ES/MS (m/z) (M + H) |
|---|---|---|---|
| 3 | N-(3,4-Dimethoxyphenyl)-1-methyl-2-oxo-quinoline-3-carboxamide | | 339.0 |
| 4 | N-(4-Fluorophenyl)-1-methyl-2-oxo-quinoline-3-carboxamide | | 297.2 |
| 5 | 1-Methyl-2-oxo-N-(p-tolyl)quinoline-3-carboxamide | | 293.0 |
| 6 | N-(4-Methoxy-2-methyl-phenyl)-1-methyl-2-oxo-quinoline-3-carboxamide | | 323.0 |
| 7 | 1-Methyl-N-(4-methyl-2-pyridyl)-2-oxo-quinoline-3-carboxamide | | 294.0 |

TABLE 1-continued
| | Examples 2-39 | | |
|---|---|---|---|
| Ex. | Chemical Name | Structure | ES/MS (m/z) (M + H) |
| 8 | N-(3-Methoxyphenyl)-1-methyl-2-oxo-quinoline-3-carboxamide | 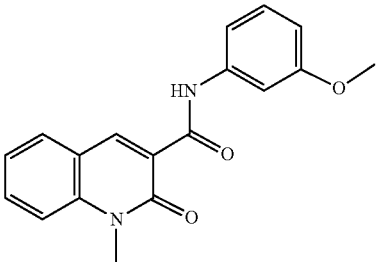 [SMILES: COc1cccc(NC(=O)c2cc3ccccc3n(C)c2=O)c1] | 309.0 |
| 9 | 1-Methyl-2-oxo-N-(2-pyridyl)quinoline-3-carboxamide | 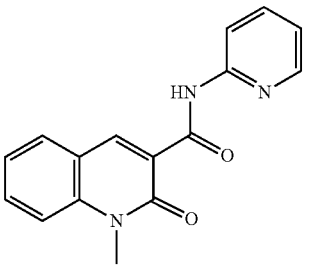 [SMILES: Cn1c(=O)c(C(=O)Nc2ccccn2)cc2ccccc21] | 280.0 |
| 10 | N-(4-Ethoxyphenyl)-1-methyl-2-oxo-quinoline-3-carboxamide | 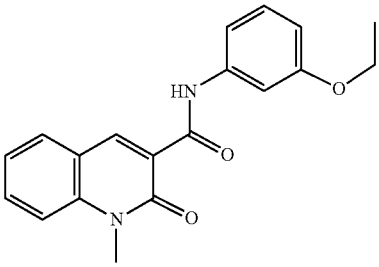 | 323.2 |
| 11 | 1-Methyl-N-(o-tolyl)-2-oxo-quinoline-3-carboxamide | 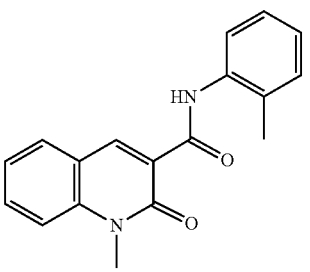 [SMILES: Cc1ccccc1NC(=O)c1cc2ccccc2n(C)c1=O] | 293.0 |
| 12 | 1-Methyl-2-oxo-N-(4-pyridyl)quinoline-3-carboxamide | 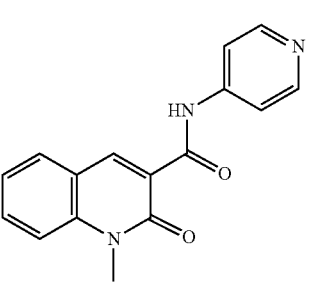 [SMILES: Cn1c(=O)c(C(=O)Nc2ccncc2)cc2ccccc21] | 280.0 |

TABLE 1-continued
Examples 2-39
| Ex. | Chemical Name | Structure | ES/MS (m/z) (M + H) |
|---|---|---|---|
| 13 | 1-Methyl-2-oxo-N-(3-pyridyl)quinoline-3-carboxamide | 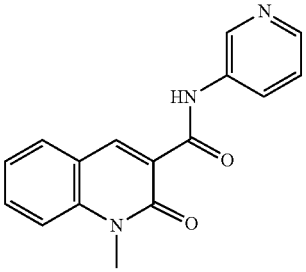 [SMILES: Cn1c(=O)c(C(=O)Nc2cccnc2)cc2ccccc21] | 280.0 |
| 14 | N-(5-Fluoropyrimidin-2-yl)-1-methyl-2-oxo-quinoline-3-carboxamide | 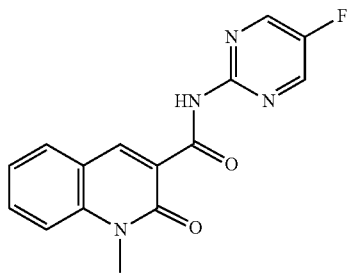 [SMILES: Cn1c(=O)c(C(=O)Nc2ncc(F)cn2)cc2ccccc21] | 299.0 |
| 15 | N-(5-Methoxypyrimidin-2-yl)-1-methyl-2-oxo-quinoline-3-carboxamide | 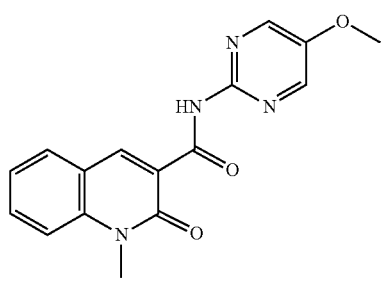 [SMILES: COc1cnc(NC(=O)c2cc3ccccc3n(C)c2=O)nc1] | 311.0 |
| 16 | N-(5-Methoxypyrazin-2-yl)-1-methyl-2-oxo-quinoline-3-carboxamide | 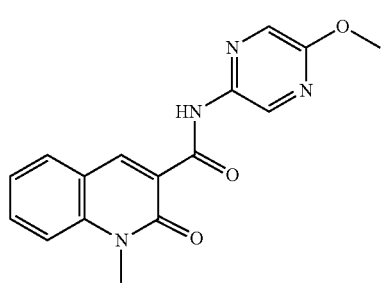 [SMILES: COc1cnc(NC(=O)c2cc3ccccc3n(C)c2=O)cn1] | 311.0 |
| 17 | 1-Methyl-N-(5-methylpyrimidin-2-yl)-2-oxo-quinoline-3-carboxamide | 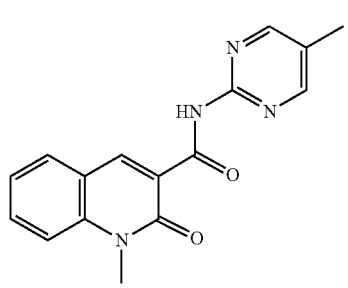 [SMILES: Cc1cnc(NC(=O)c2cc3ccccc3n(C)c2=O)nc1] | 295.0 |

TABLE 1-continued
Examples 2-39
| Ex. | Chemical Name | Structure | ES/MS (m/z) (M + H) |
|---|---|---|---|
| 18 | N-(4-Fluorophenyl)-1-methyl-2-oxo-1,8-naphthyridine-3-carboxamide | 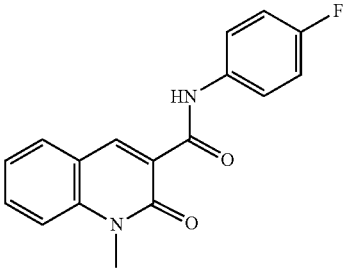 [SMILES: Cn1c(=O)c(C(=O)Nc2ccc(F)cc2)cc2ccccc21] | 298.0 |
| 19 | 1-Methyl-N-(6-methyl-2-pyridyl)-2-oxo-quinoline-3-carboxamide | 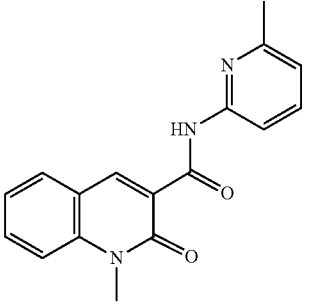 [SMILES: Cc1cccc(NC(=O)c2cc3ccccc3n(C)c2=O)n1] | 294.0 |
| 20 | 1-Methyl-N-(5-methyl-2-pyridyl)-2-oxo-quinoline-3-carboxamide | 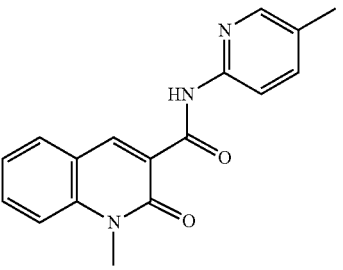 [SMILES: Cc1ccc(NC(=O)c2cc3ccccc3n(C)c2=O)nc1] | 294.0 |
| 21 | N-(6-Methoxy-2-pyridyl)-1-methyl-2-oxo-quinoline-3-carboxamide | 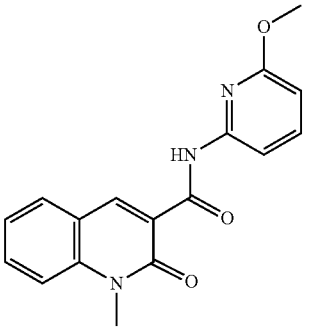 [SMILES: COc1cccc(NC(=O)c2cc3ccccc3n(C)c2=O)n1] | 310.0 |
| 22 | N-(5-Fluoro-2-pyridyl)-1-methyl-2-oxo-quinoline-3-carboxamide | 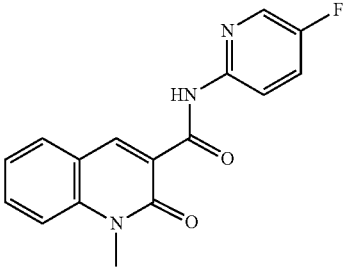 [SMILES: Cn1c(=O)c(C(=O)Nc2ccc(F)cn2)cc2ccccc21] | 298.0 |

TABLE 1-continued

Examples 2-39

| Ex. | Chemical Name | Structure | ES/MS (m/z) (M + H) |
|---|---|---|---|
| 23 | N-(3-Fluorophenyl)-1-methyl-2-oxo-quinoline-3-carboxamide | 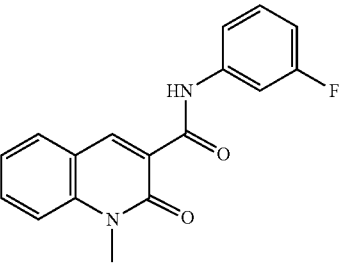 [SMILES: Cn1c(=O)c(C(=O)Nc2cccc(F)c2)cc2ccccc21] | 297.0 |
| 24 | N-(6-Cyano-3-pyridyl)-1-methyl-2-oxo-quinoline-3-carboxamide | 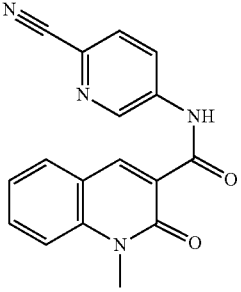 [SMILES: Cn1c(=O)c(C(=O)Nc2ccc(C#N)nc2)cc2ccccc21] | 305.1 |
| 25 | N-(4-Methoxyphenyl)-2-oxo-1-azatricyclo[7.3.1.05,13]trideca-3,5,7,9(13)-tetraene-3-carboxamide | 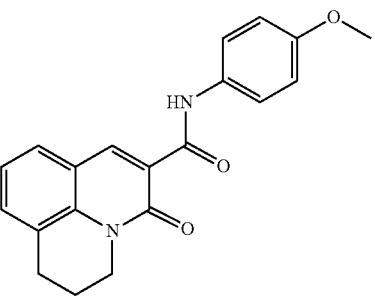 [SMILES: COc1ccc(NC(=O)c2cc3cccc4c3n(c2=O)CCC4)cc1] | 335.0 |
| 26 | N-(4-Methoxyphenyl)-11-oxo-1-azatricyclo[6.3.1.04,12]dodeca-4(12),5,7,9-tetraene-10-carboxamide | 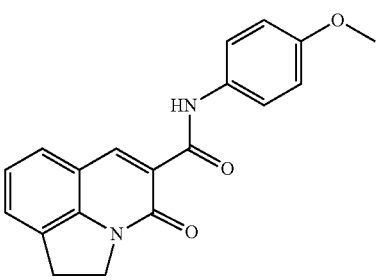 [SMILES: COc1ccc(NC(=O)c2cc3cccc4c3n(c2=O)CC4)cc1] | 321.0 |
| 27 | 1-Methyl-N-(1-methylpyrazol-4-yl)-2-oxo-4a,8a-dihydroquinoline-3-carboxamide; hydrochloride | 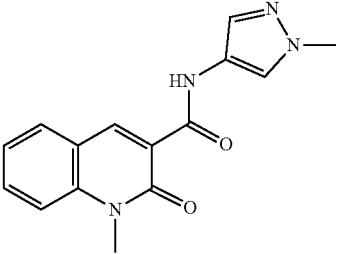 [SMILES: Cn1cc(NC(=O)c2cc3ccccc3n(C)c2=O)cn1] | 283.0 |

TABLE 1-continued

Examples 2-39

| Ex. | Chemical Name | Structure | ES/MS (m/z) (M + H) |
|---|---|---|---|
| 28 | N-(3-Fluoro-2-pyridyl)-1-methyl-2-oxo-quinoline-3-carboxamide | | 298.0 |
| 29 | 11-Oxo-N-(p-tolyl)-1-azatricyclo[6.3.1.0⁴,¹²]dodeca-4(12),5,7,9-tetraene-10-carboxamide | | 305.0 |
| 30 | N-(4-Fluorophenyl)-11-oxo-1-azatricyclo[6.3.1.0⁴,¹²]dodeca-4(12),5,7,9-tetraene-10-carboxamide | | 309.0 |
| 31 | 11-Oxo-N-[rel-(1S,3R)-3-methoxycyclopentyl]-1-azatricyclo[6.3.1.0⁴,¹²]dodeca-4(12),5,7,9-tetraene-10-carboxamide | | 313.0 |
| 32 | N-(3-Bicyclo[1.1.1]pentanyl)-1-methyl-2-oxo-quinoline-3-carboxamide | | 269.0 |

TABLE 1-continued

Examples 2-39

| Ex. | Chemical Name | Structure | ES/MS (m/z) (M + H) |
|---|---|---|---|
| 33 | 11-Oxo-N-[4-(trifluoromethyl)phenyl]-1-azatricyclo[6.3.1.0⁴,¹²]dodeca-4(12),5,7,9-tetraene-10-carboxamide | 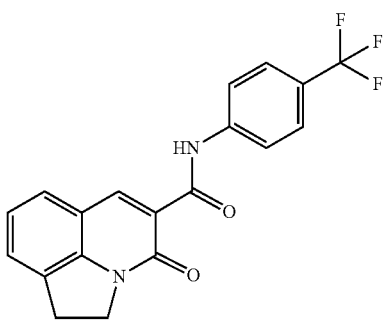 [SMILES: O=C(Nc1ccc(C(F)(F)F)cc1)c1cc2cccc3c2n(c1=O)CC3] | 359.0 |
| 34 | 2-Oxo-N-phenyl-1H-quinoline-3-carboxamide | 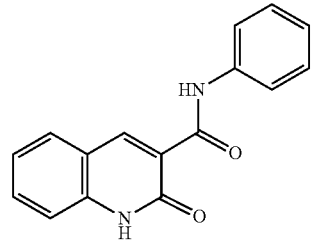 [SMILES: O=C(Nc1ccccc1)c1cc2ccccc2[nH]c1=O] | 265.0 |
| 35 | N-(4-Methoxyphenyl)-1-methyl-2-oxo-1,8-naphthyridine-3-carboxamide | 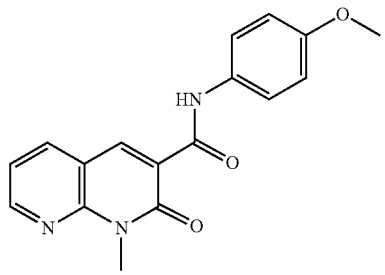 [SMILES: COc1ccc(NC(=O)c2cc3cccnc3n(C)c2=O)cc1] | 310.0 |
| 36 | 7-Bromo-N-(4-methoxyphenyl)-1-methyl-2-oxo-quinoline-3-carboxamide | 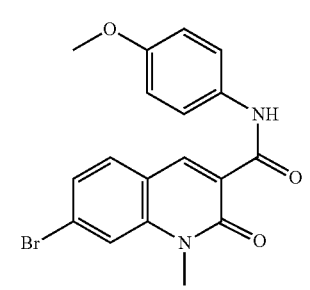 [SMILES: COc1ccc(NC(=O)c2cc3ccc(Br)cc3n(C)c2=O)cc1] | 387.0/389.0 |
| 37 | N-(5-Fluoro-2-pyridyl)-11-oxo-1-azatricyclo[6.3.1.0⁴,¹²]dodeca-4(12),5,7,9-tetraene-10-carboxamide | 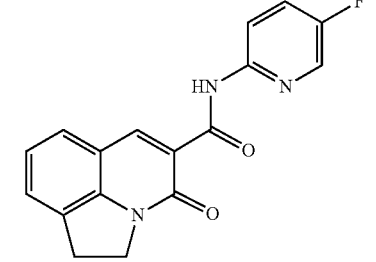 | 310.0 |

TABLE 1-continued

Examples 2-39

| Ex. | Chemical Name | Structure | ES/MS (m/z) (M + H) |
|---|---|---|---|
| 38 | 11-Oxo-N-pyrimidin-2-yl-1-azatricyclo[6.3.1.04,12]dodeca-4(12),5,7,9-tetraene-10-carboxamide | | 293.0 |
| 39 | 1-Methyl-2-oxo-N-pyrimidin-2-yl-quinoline-3-carboxamide | | 281.0 |

Intermediate 4 tert-Butyl 4-[4-[(11-oxo-1-azatricyclo[6.3.1.04,12]dodeca-4(12),5,7,9-tetraene-10-carbonyl)amino]phenyl]piperidine-1-carboxylate

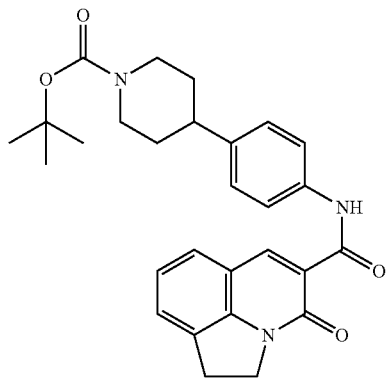 [SMILES: CC(C)(C)OC(=O)N1CCC(c2ccc(NC(=O)c3cc4cccc5c4n(c3=O)CC5)cc2)CC1]

The titular intermediate was synthesized essentially as described for N-(4-methoxyphenyl)-1-methyl-2-oxo-quinoline-3-carboxamide (Example 1) using the appropriate starting material and reagents. ES/MS (m/z) (M+H) 375.2.

Example 40

7-Bromo-1-methyl-2-oxo-N-phenyl-quinoline-3-carboxamide

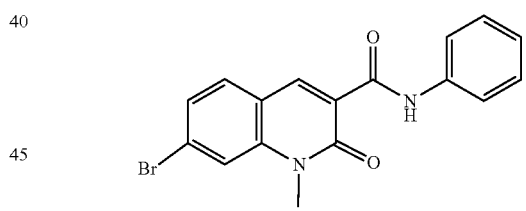

Trimethylaluminum (2 M) in hexanes (0.5 ml, 1.0 mmol) is slowly added to a 0° C. solution of aniline (0.10 mL, 1.1 mmol) in toluene (2.1 mL, 20 mmol). The reaction is allowed to warm to ambient temperature and stirred for 10 min. Ethyl 7-bromo-1-methyl-2-oxo-quinoline-3-carboxylate (0.208 g, 0.671 mmol) is added as a solid. The reaction is sealed and heated via microwave irradiation to 100° C. for 3 hrs. The reaction is poured into a separatory funnel containing Rochelle's salt and extracted with ethyl acetate (×3). The combined organics are washed with 1 N aqueous HCl followed by brine and concentrated in vacuo. The resulting material is purified by silica gel chromatography eluting with 0-100% ethyl acetate/hexanes gradient to give the titular product (0.140 g, 0.392 mmol, 58.4% Yield). ES/MS (m/z) ($^{79}$Br/$^{81}$Br): (M+H) 357.0/359.0. $^1$H NMR (399.80 MHz, CDCl$_3$): 11.96 (s, 1H), 8.97 (s, 1H), 7.80-7.77 (m, 2H), 7.69-7.65 (m, 2H), 7.50 (dd, J=1.7, 8.3 Hz, 1H), 7.42-7.37 (m, 2H), 7.18-7.14 (m, 1H), 3.83 (s, 3H).

Example 41

N-(5-Methyl-2-pyridyl)-11-oxo-1-azatricyclo[6.3.1.04, 12]dodeca-4(12),5,7,9-tetraene-10-carboxamide

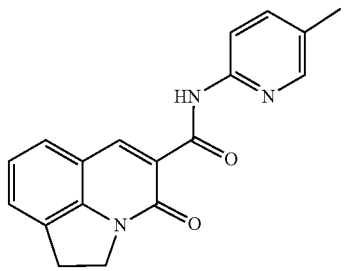 [SMILES: Cc1ccc(NC(=O)c2cc3cccc4c3n(c2=O)CC4)nc1]

DIEA (0.12 mL, 0.66 mmol) is added to a solution of 4-oxo-1,2-dihydro-4h-pyrrolo[3,2,1-IJ]quinoline-5-carboxylic acid (0.075 g, 0.33 mmol), 2-amino-5-methylpyridine (0.041 g, 0.36 mmol), and 1-propanephosphonic anhydride (50% mass) in ethyl acetate (0.39 mL, 0.66 mmol, 1.67 mol/L) and dichloromethane (2 mL). The resulting mixture is stirred for 1 hr. at 80° C. The reaction is cooled to ambient temperature and washed with aqueous saturated ammonium chloride. The organics are dried over anhydrous magnesium sulfate, filtered, and concentrated in vacuo. The residue is purified by silica gel chromatography, eluted with 0-100% ethyl acetate in hexanes to give the titular product (3.9 mg, 0.013 mmol, 3.9%). ES/MS (m/z): 306.0 (M+H). $^1$H NMR (399.80 MHz, d6-DMSO): 12.54 (s, 1H), 9.05 (s, 1H), 8.24-8.22 (m, 2H), 7.82 (dd, J=0.7, 8.0 Hz, 1H), 7.72-7.68 (m, 1H), 7.63-7.61 (m, 1H), 7.33 (dd, J=7.3, 8.0 Hz, 1H), 4.51-4.47 (m, 2H), 3.49 (t, J=7.9 Hz, 2H), 2.29 (s, 3H).

The following examples in Table 2 are synthesized essentially as described for N-(5-methyl-2-pyridyl)-11-oxo-1-azatricyclo[6.3.1.04, 12]dodeca-4(12),5,7,9-tetraene-10-carboxamide (Example 41) using the appropriate starting material and reagents.

TABLE 2

Examples 42 and 43

| Ex. | Chemical Name | Structure | ES/MS (m/z) (M + H) |
|---|---|---|---|
| 42 | 11-Oxo-N-(2-pyridyl)-1-azatricyclo[6.3.1.04,12]dodeca-4(12),5,7,9-tetraene-10-carboxamide | | 291.24592.0 |
| 43 | N-(1-Methyl-2-oxo-1,8-naphthyridin-3-yl)benzamide | | 280.3 |

The following intermediates in Table 3 are synthesized essentially as described for N-(5-methyl-2-pyridyl)-11-oxo-1-azatricyclo[6.3.1.0⁴,¹²]dodeca-4(12),5,7,9-tetraene-10-carboxamide (Example 41) using the appropriate starting material and reagents.

TABLE 3

Intermediates 5-9

| Int. | Chemical Name | Structure | Analytical Data |
|---|---|---|---|
| 5 | 8-Bromo-1-methyl-2-oxo-N-phenyl-quinoline-3-carboxamide | | ES/MS (m/z) ($^{79}$Br/$^{81}$Br): 357.0/359.0 |
| 6 | 5-Bromo-1-methyl-2-oxo-N-phenyl-quinoline-3-carboxamide | | ES/MS (m/z) ($^{79}$Br/$^{81}$Br): 357.0/359.0 |
| 7 | 6-Bromo-1-methyl-2-oxo-N-phenyl-quinoline-3-carboxamide | | ES/MS (m/z) ($^{79}$Br/$^{81}$Br): 357.0/359.0 |
| 8 | 5-Bromo-N-(5-fluoro-2-pyridyl)-1-methyl-2-oxo-quinoline-3-carboxamide | | 1H NMR (400.14 MHz, CDCl$_3$): 12.46-12.39 (m, 1H), 9.34 (s, 1H), 8.36 (dd, J = 4.1, 9.1 Hz, 1H), 8.17 (d, J = 3.0 Hz, 1H), 7.95 (s, 1H), 7.56-7.54 (m, 1H), 7.50-7.41 (m, 3H), 3.78 (s, 3H). |
| 9 | 5-Bromo-N-(5-fluoropyrimidin-2-yl)-1-methyl-2-oxo-quinoline-3-carboxamide | | ES/MS (m/z) ($^{79}$Br/$^{81}$Br): 377.0/379.0 |

Intermediate 10

5-Bromo-1-methyl-2-oxo-N-(2-pyridyl)quinoline-3-carboxamide

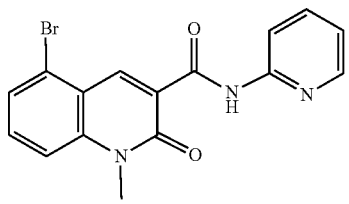 [SMILES: Cn1c(=O)c(C(=O)Nc2ccccn2)cc2c(Br)cccc21]

Pyridine (255 mg, 3.224 mmol) and POCl$_3$ (200 mg, 1.3044 mmol) are added to a solution of 5-bromo-1-methyl-2-oxo-quinoline-3-carboxylic acid (500 mg, 1.7725 mmol) and pyridin-2-amine (205 mg, 2.178 mmol) in dichloromethane (5 mL). The resulting mixture is stirred at 20° C. for 2 hrs. The mixture is concentrated under reduced pressure. The resulting residue is triturated with methanol at ambient temperature for 10 min, then filtered to give 5-bromo-1-methyl-2-oxo-N-(2-pyridyl)quinoline-3-carboxamide (600 mg, 1.675 mmol, 94.5000 Yield) ES/MS (m/z) ($^{79}$Br/$^{81}$Br): 357.9/359.9 (M+H).

The following intermediates in Table 4 are synthesized essentially as described for 5-bromo-1-methyl-2-oxo-N-(2-pyridyl)quinoline-3-carboxamide (Intermediate 10) using the appropriate starting material and reagents.

TABLE 4

| | Intermediates 11-17 | | |
|---|---|---|---|
| Int. | Chemical Name | Structure | Analytical Data |
| 11 | 6-Bromo-1-methyl-2-oxo-N-(2-pyridyl)quinoline-3-carboxamide | | ES/MS (m/z) ($^{79}$Br/$^{81}$Br): 357.9/359.9 |
| 12 | 6-Bromo-N-(5-fluoro-2-pyridyl)-1-methyl-2-oxo-quinoline-3-carboxamide | | ES/MS (m/z) ($^{79}$Br/$^{81}$Br): 373.0/376.0 |
| 13 | 5-Bromo-1-methyl-2-oxo-N-[5-(trifluoromethyl)pyrimidin-2-yl]quinoline-3-carboxamide | | ES/MS (m/z) ($^{79}$Br/$^{81}$Br): 425.8/428.8 |

TABLE 4-continued

Intermediates 11-17

| Int. | Chemical Name | Structure | Analytical Data |
| --- | --- | --- | --- |
| 14 | 6-Bromo-1-methyl-2-oxo-N-[5-(trifluoromethyl)pyrimidin-2-yl]quinoline-3-carboxamide | 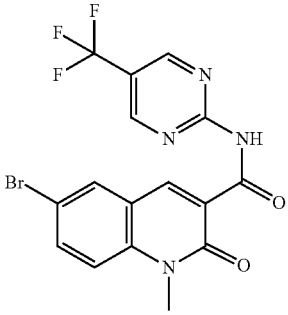 [SMILES: Cn1c(=O)c(C(=O)Nc2ncc(C(F)(F)F)cn2)cc2cc(Br)ccc21] | ES/MS (m/z) ($^{79}$Br/$^{81}$Br): 426.0/429.0 |
| 15 | 6-Bromo-N-(5-fluoropyrimidin-2-yl)-1-methyl-2-oxo-quinoline-3-carboxamide | 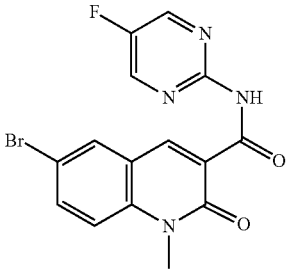 [SMILES: Cn1c(=O)c(C(=O)Nc2ncc(F)cn2)cc2cc(Br)ccc21] | ES/MS (m/z) ($^{79}$Br/$^{81}$Br): 374.1/377.1 |
| 16 | 7-Bromo-N-(5-fluoropyrimidin-2-yl)-1-methyl-2-oxo-quinoline-3-carboxamide | 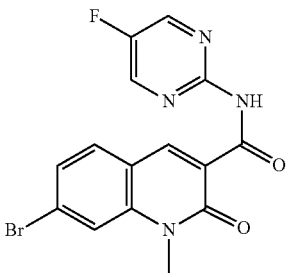 [SMILES: Cn1c(=O)c(C(=O)Nc2ncc(F)cn2)cc2ccc(Br)cc21] | 1H NMR (400.13 MHz, CDCl$_3$): 12.75-12.71 (m, 1H), 8.92 (s, 1H), 8.74 (d, J = 5.1 Hz, 1H), 8.50 (s, 2H), 7.91 (dd, J = 6.7, 7.3 Hz, 1H), 7.64-7.58 (m, 2H), 7.43 (dd, J = 1.6, 8.4 Hz, 1H), 3.77-3.76 (m, 3H). |
| 17 | 5-Bromo-N-(5-fluorothiazol-2-yl)-1-methyl-2-oxo-quinoline-3-carboxamide | 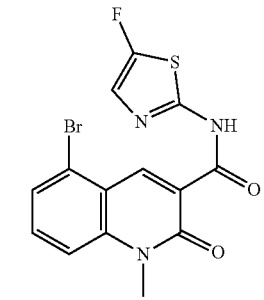 [SMILES: Cn1c(=O)c(C(=O)Nc2ncc(F)s2)cc2c(Br)cccc21] | 383.9 |

Example 44

N-(4-Methoxyphenyl)-1,7-dimethyl-2-oxo-quinoline-3-carboxamide

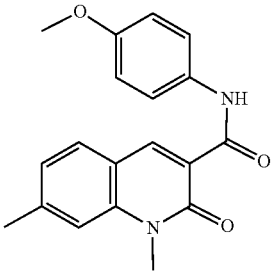 [SMILES: COc1ccc(NC(=O)c2cc3ccc(C)cc3n(C)c2=O)cc1]

7-Bromo-N-(4-methoxyphenyl)-1-methyl-2-oxo-quinoline-3-carboxamide (0.100 g, 0.258 mmol) is dissolved in 1,4-dioxane (1.5 mL, 18 mmol). Methyl boronic acid (0.038 g, 0.62 mmol) and cesium carbonate (0.165 g, 0.506 mmol) are added. Nitrogen is bubbled through the reaction mixture for 5 min. 1,1′-bis(diphenylphosphino)ferrocene-palladium (II) dichloride dichloromethane complex (0.036 g, 0.043 mmol) is added then sealed and heated via microwave to 100° C. for 2 hrs. The crude reaction is purified by silica gel chromatography, eluted with 0-50% ethyl acetate/hexanes to give the titular product (0.015 g, 0.047 mmol, 18% Yield). ES/MS (m/z) (M+H): 323.0. $^1$H NMR (399.80 MHz, CDCl$_3$): 12.02-11.96 (m, 1H), 8.99 (s, 1H), 7.74-7.71 (m, 3H), 7.27 (m, 1H), 7.21 (d, J=7.7 Hz, 1H), 6.94 (d, J=8.8 Hz, 2H), 2.59 (s, 3H), 1.59 (s, 3H).

Example 45

7-Cyclopropyl-N-(4-methoxyphenyl)-1-methyl-2-oxo-quinoline-3-carboxamide

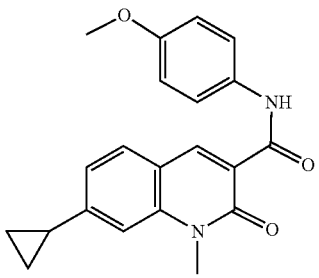 [SMILES: COc1ccc(NC(=O)c2cc3ccc(C4CC4)cc3n(C)c2=O)cc1]

The titular compound is synthesized essentially as described for N-(4-methoxyphenyl)-1,7-dimethyl-2-oxo-quinoline-3-carboxamide (Example 44) using the appropriate starting material and reagents. ES/MS (m/z) ($^{79}$Br/$^{81}$Br): (M+H) 349.0.

Example 46

N-(4-Methoxyphenyl)-1-methyl-7-(methylamino)-2-oxo-quinoline-3-carboxamide

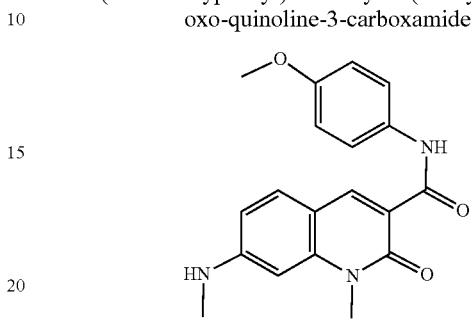

7-Bromo-N-(4-methoxyphenyl)-1-methyl-2-oxo-quinoline-3-carboxamide (0.154 g, 0.398 mmol) is dissolved in toluene (2 mL). Sodium tert-butoxide (0.100 g, 1.01 mmol) is added. Nitrogen is bubbled through the reaction for 10 min. Methylamine (2.0 mol/L) in tetrahydrofuran (0.600 mL, 1.2 mmol) is added followed by (R)-(+)-2,2′-bis(diphenylphosphino)-1,1′-binaphthyl (0.035 g, 0.055 mmol) then tris(dibenzylideneacetone)dipalladium(0) (0.040 g, 0.042 mmol). The reaction is sealed and heated via microwave to 80° C. for 2 hrs. The crude reaction is purified via silica gel chromatography eluting with 0-10% (7 N NH$_3$ in methanol)/dichloromethane to give the crude product. The crude product is purified with SCX ion exchange column rinsed with 1:1 methanol/dichloromethane followed by methanol then 7 N ammonia in methanol (×2). The ammonia containing rinse is concentrated in vacuo to give the titular product (33 mg, 0.0978 mmol, 24.6%). ES/MS (m/z) (M+H) 338.0. $^1$H NMR (399.80 MHz, CDCl$_3$): 11.99 (s, 1H), 8.82 (s, 1H), 7.73-7.70 (m, 2H), 7.54 (d, J=8.7 Hz, 1H), 6.93-6.91 (m, 2H), 6.62 (dd, J=2.0, 8.6 Hz, 1H), 6.34 (d, J=1.9 Hz, 1H), 3.83 (s, 3H), 3.77 (s, 3H).

The following Examples in Table 5 are synthesized essentially as described for N-(4-Methoxyphenyl)-1-methyl-7-(methylamino)-2-oxo-quinoline-3-carboxamide (Example 46) using the appropriate starting material and reagents.

TABLE 5

Examples 47-56

| Ex. | Chemical Name | Structure | ES/MS (m/z) (M + H) |
|---|---|---|---|
| 47 | 7-(Dimethylamino)-N-(4-methoxyphenyl)-1-methyl-2-oxo-quinoline-3-carboxamide | | 352.0 |

TABLE 5-continued

Examples 47-56

| Ex. | Chemical Name | Structure | ES/MS (m/z) (M + H) |
|---|---|---|---|
| 48 | 5-[2-(Dimethylamino)ethylamino]-1-methyl-2-oxo-N-phenyl-quinoline-3-carboxamide | | 365.4 |
| 49 | 6-[2-(Dimethylamino)ethylamino]-1-methyl-2-oxo-N-phenyl-quinoline-3-carboxamide | | 365.4 |
| 50 | 8-[2-(Dimethylamino)ethylamino]-1-methyl-2-oxo-N-phenyl-quinoline-3-carboxamide | | 365.4 |
| 51 | 5-[2-(Dimethylamino)ethylamino]-N-(5-fluoro-2-pyridyl)-1-methyl-2-oxo-quinoline-3-carboxamide | | 384.4 |

TABLE 5-continued

Examples 47-56

| Ex. | Chemical Name | Structure | ES/MS (m/z) (M + H) |
|---|---|---|---|
| 52 | 6-[2-(Dimethylamino)ethylamino]-N-(5-fluoro-2-pyridyl)-1-methyl-2-oxo-quinoline-3-carboxamide | | 383.9 |
| 53 | 5-[2-(Dimethylamino)ethylamino]-1-methyl-2-oxo-N-(2-pyridyl)quinoline-3-carboxamide | | 366.4 |
| 54 | 5-[2-(Dimethylamino)ethylamino]-1-methyl-2-oxo-N-[5-(trifluoromethyl)pyrimidin-2-yl]quinoline-3-carboxamide | | 465.4 |
| 55 | 6-[2-(Dimethylamino)ethylamino]-1-methyl-2-oxo-N-(2-pyridyl)quinoline-3-carboxamide | | 366.4 |
| 56 | 7-[2-(Dimethylamino)ethylamino]-N-(4-methoxyphenyl)-1-methyl-2-oxo-quinoline-3-carboxamide | | 395.2 |

The following Intermediates in Table 6 are synthesized essentially as described for N-(4-Methoxyphenyl)-1-methyl-7-(methylamino)-2-oxo-quinoline-3-carboxamide (Example 46) using the appropriate starting material and reagents.

TABLE 6

Intermediates 18-25

| Int. | Chemical Name | Structure | ES/MS (m/z) (M + H) |
|---|---|---|---|
| 18 | 6-[2-[tert-Butyl(dimethyl)silyl]oxyethylamino]-1-methyl-2-oxo-N-phenyl-quinoline-3-carboxamide | | 452.3 |
| 19 | 5-[2-[tert-Butyl(dimethyl)silyl]oxyethylamino]-1-methyl-2-oxo-N-phenyl-quinoline-3-carboxamide | | 452.3 |
| 20 | 5-[2-[tert-Butyl(dimethyl)silyl]oxyethylamino]-N-(5-fluorothiazol-2-yl)-1-methyl-2-oxo-quinoline-3-carboxamide | | 477.3 |

TABLE 6-continued

Intermediates 18-25

| Int. | Chemical Name | Structure | ES/MS (m/z) (M + H) |
|---|---|---|---|
| 21 | 5-[2-[tert-Butyl(dimethyl)silyl]oxyethylamino]-1-methyl-2-oxo-N-(2-pyridyl)quinoline-3-carboxamide | | 453.3 |
| 22 | 5-[2-[tert-Butyl(dimethyl)silyl]oxyethylamino]-N-(5-fluoro-2-pyridyl)-1-methyl-2-oxo-quinoline-3-carboxamide | | 471.3 |
| 23 | 5-[2-[tert-Butyl(dimethyl)silyl]oxyethylamino]-N-(5-fluoropyrimidin-2-yl)-1-methyl-2-oxo-quinoline-3-carboxamide | | 472.2 |
| 24 | 5-[2-[tert-Butyl(dimethyl)silyl]oxyethylamino]-1-methyl-2-oxo-N-[5-(trifluoromethyl)pyrimidin-2-yl]quinoline-3-carboxamide | | 522.2 |

TABLE 6-continued

Intermediates 18-25

| Int. | Chemical Name | Structure | ES/MS (m/z) (M + H) |
|---|---|---|---|
| 25 | 7-[2-[tert-Butyl(dimethyl)silyl]oxyethylamino]-1-methyl-2-oxo-N-phenyl-quinoline-3-carboxamide | | 452.7 |

Example 57

5-[2-(Dimethylamino)ethylamino]-N-(5-fluoropyrimidin-2-yl)-1-methyl-2-oxo-quinoline-3-carboxamide Alternative Synthesis for Example 57

5-[2-(Dimethylamino)ethylamino]-N-(5-fluoropyrimidin-2-yl)-1-methyl-2-oxo-quinoline-3-carboxamide

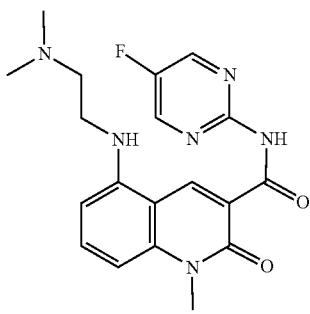

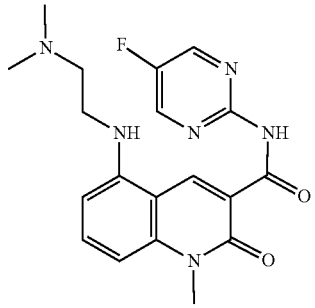

BrettPhos Pd G3 (75 mg, 0.0786 mmol), Pd$_2$(dba)$_3$ (73 mg, 0.0797 mmol) are added to a solution of 5-bromo-N-(5-fluoropyrimidin-2-yl)-1-methyl-2-oxo-quinoline-3-carboxamide (100 mg, 0.2651 mmol), 2-(4,4-difluoro-1-piperidyl)ethanamine (150 mg, 0.3977 mmol) and t-BuONa (117 mg, 1.1930 mmol) in N,N-dimethylethylenediamine (185 mg, 1.994 mmol). The reaction mixture is stirred at 130° C. for 12 hrs., then concentrated in vacuo to give a residue. The residue is purified by silica gel chromatography eluting with 0-5% methanol/dichloromethane to give the crude product. The crude product is triturated with MeOH at 20° C. for 5 min. The mixture is filtered to give the titular product (17.74 mg, 0.0357 mmol, 8.973%). ES/MS (m/z) (M+H) 385.2. $^1$H NMR (400.14 MHz, d6-DMSO): 12.93 (s, 1H), 9.28 (s, 1H), 8.82 (s, 2H), 7.64-7.59 (m, 1H), 7.20-7.13 (m, 1H), 6.87 (d, J=8.5 Hz, 1H), 6.66-6.62 (m, 1H), 3.73 (s, 3H), 3.66-3.63 (m, 2H), 3.47-3.45 (m, -2H), 2.84 (s, 6H).

BrettPhos Pd G3 (75 mg, 0.0786 mmol), Pd$_2$(dba)$_3$ (73 mg, 0.0797 mmol) are added to a solution of 5-bromo-N-(5-fluoropyrimidin-2-yl)-1-methyl-2-oxo-quinoline-3-carboxamide (100 mg, 0.2651 mmol), N,N-dimethylethylenediamine (185 mg, 1.994 mmol) and t-BuONa (117 mg, 1.1930 mmol) in DMF (4 mL). The reaction mixture is stirred at 130° C. for 12 hrs., then concentrated in vacuo to give a residue. The residue is purified by silica gel chromatography eluting with 0-5% methanol/dichloromethane to give the crude product. The crude product is triturated with MeOH at 20° C. for 5 min. The mixture is filtered to give the titular product (17.74 mg, 0.0357 mmol, 8.973%). ES/MS (m/z) (M+H) 385.2. $^1$H NMR (400.14 MHz, d6-DMSO): 12.93 (s, 1H), 9.28 (s, 1H), 8.82 (s, 2H), 7.64-7.59 (m, 1H), 7.20-7.13 (m, 1H), 6.87 (d, J=8.5 Hz, 1H), 6.66-6.62 (m, 1H), 3.73 (s, 3H), 3.66-3.63 (m, 2H), 3.47-3.45 (m, -2H), 2.84 (s, 6H).

Intermediate 26

6-[2-[tert-Butyl(dimethyl)silyl]oxyethylamino]-N-(5-fluoro-2-pyridyl)-1-methyl-2-oxo-quinoline-3-carboxamide

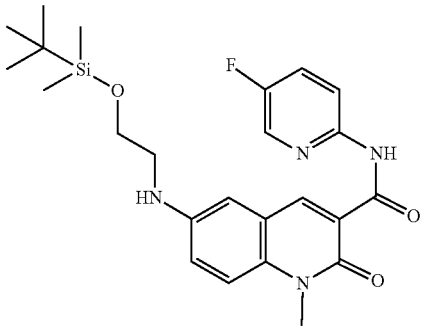

BrettPhos Pd G3 (32 mg, 0.033 mmol) is added to a solution of 6-bromo-N-(5-fluoro-2-pyridyl)-1-methyl-2-oxo-quinoline-3-carboxamide (250 mg, 0.6313 mmol), 2-(4,4-difluoro-1-piperidyl)ethanamine (150 mg, 0.3977 mmol) and t-BuONa (75 mg, 0.765 mmol) in THF (5 mL). The reaction mixture is stirred at 100° C. for 16 hrs. then concentrated in vacuo to give a residue. The residue is purified by silica gel chromatography eluting with 0-70% petroleum ether/ethyl acetate to give the titular product (200 mg, 0.2975 mmol, 47.12%). ES/MS (m/z) (M+H) 471.2. $^1$H NMR (400.14 MHz, d6-DMSO): 12.83 (s, 1H), 8.81 (s, 1H), 8.36-8.31 (m, 3H), 7.83-7.75 (m, 1H), 7.46 (d, J=9.3 Hz, 1H), 7.21 (dd, J=2.6, 9.1 Hz, 1H), 7.06 (d, J=2.6 Hz, 1H), 5.82 (t, J=5.9 Hz, 1H), 3.74-3.70 (m, 6H), 3.20 (q, J=5.9 Hz, 2H), 0.83 (s, 10H), −0.00 (s, 6H).

Alternative Synthesis for Intermediate 26

6-[2-[tert-Butyl(dimethyl)silyl]oxyethylamino]-N-(5-fluoro-2-pyridyl)-1-methyl-2-oxo-quinoline-3-carboxamide

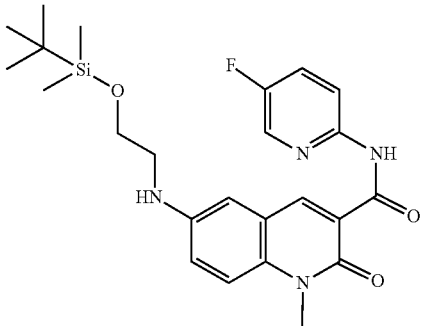

BrettPhos Pd G3 (32 mg, 0.033 mmol) is added to a solution of 6-bromo-N-(5-fluoro-2-pyridyl)-1-methyl-2-oxo-quinoline-3-carboxamide (250 mg, 0.6313 mmol), 2-[tert-butyl(dimethyl)silyl]oxyethanamine (335 mg, 1.91 mmol) and t-BuONa (75 mg, 0.765 mmol) in THF (5 mL). The reaction mixture is stirred at 100° C. for 16 hrs. then concentrated in vacuo to give a residue. The residue is purified by silica gel chromatography eluting with 0-300% ethyl acetate/petroleum ether to give the titular product (200 mg, 0.2975 mmol, 47.12%). ES/MS (m/z) (M+H) 471.2. $^1$H NMR (400.14 MHz, d6-DMSO): 12.83 (s, 1H), 8.81 (s, 1H), 8.36-8.31 (m, 3H), 7.83-7.75 (m, 1H), 7.46 (d, J=9.3 Hz, 1H), 7.21 (dd, J=2.6, 9.1 Hz, 1H), 7.06 (d, J=2.6 Hz, 1H), 5.82 (t, J=5.9 Hz, 1H), 3.74-3.70 (m, 6H), 3.20 (q, J=5.9 Hz, 2H), 0.83 (s, 10H), −0.00 (s, 6H).

Example 58

6-(2-Hydroxyethoxy)-1-methyl-2-oxo-N-phenyl-quinoline-3-carboxamide

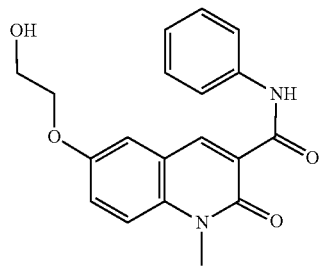

Step A: 6-Bromo-1-methyl-2-oxo-N-phenyl-quinoline-3-carboxamide (2.005 g, 5.052 mmol) and 1,4-dioxane (10 mL) are added together. Trisdibenzilidenedipalladium (0) (465 mg, 0.508 mmol), tBuXphos (443 mg, 1.012 mmol), and potassium hydroxide (876 mg, 15.15 mmol) in water (10 mL, 555.1 mmol) are then added. The mixture is stirred at 100° C. for 15 hrs., then cooled to ambient temperature. Water (100 mL) is added to the cooled reaction. The resulting mixture is extracted with ethyl acetate (50 mL×3). The organic layers are combined, dried over anhydrous sodium sulfate, filtered, and concentrated in vacuo to give a residue. The residue is purified by silica gel chromatography, eluting with 0-50% ethyl acetate/petroleum ether to give 6-hydroxy-1-methyl-2-oxo-N-phenyl-quinoline-3-carboxamide (1 g, 3.058 mmol, 60.54%). ES/MS (m/z) (M+H) 370.2. $^1$H NMR (400.15 MHz, d6-DMSO): 12.38 (s, 1H), 8.79 (s, 1H), 7.74 (d, J=7.6 Hz, 2H), 7.52 (d, J=9.3 Hz, 1H), 7.39 (t, J=7.9 Hz, 2H), 7.30-7.25 (m, 1H), 7.23 (d, J=2.6 Hz, 1H), 7.15-7.11 (m, 1H), 3.76 (s, 3H).

Step B: 6-Hydroxy-1-methyl-2-oxo-N-phenyl-quinoline-3-carboxamide (101 mg, 0.309 mmol) is dissolved in dimethylformamide (2 mL). 2-(2-bromoethoxy)tetrahydropyran (101 mg, 0.483 mmol) and cesium carbonate (403 mg, 1.237 mmol). The mixture is stirred at 80° C. for 12 hrs., then cooled to ambient temperature. Water (50 mL) is added to the cooled reaction. The mixture is extracted with ethyl acetate (20 mL×3). The organic layers are combined, dried over anhydrous sodium sulfate, filtered, and concentrated in vacuo to give a residue. The residue is purified by silica gel chromatography eluting with 0-100% ethyl acetate/petroleum ether to give 1-methyl-2-oxo-N-phenyl-6-(2-tetrahydropyran-2-yloxyethoxy)quinoline-3-carboxamide (60 mg, 0.128 mmol, 41.38%) ES/MS (m/z) (M+H) 423.2. $^1$H NMR (400.14 MHz, CDCl$_3$): 12.24-12.20 (m, 1H), 8.97 (s, 1H), 7.82 (d, J=7.8 Hz, 2H), 7.42-7.38 (m, 3H), 7.18-7.14 (m, 1H), 4.75 (dd, J=3.2, 3.8 Hz, 1H), 4.31-4.27 (m, 2H), 4.17-4.12 (m, 2H), 3.86 (s, 6H), 3.62-3.57 (m, 1H), 1.93-1.91 (m, 2H), 1.73-1.71 (m, 4H), 1.30-1.27 (m, 1H).

Step C; Example 58: 1-Methyl-2-oxo-N-phenyl-6-(2-tetrahydropyran-2-yloxyethoxy)quinoline-3-carboxamide (60 mg, 0.1278 mmol) is dissolve in 1M hydrochloric acid in ethyl acetate (2 mL). The mixture is stirred at ambient temperature for 2 hrs. The reaction mixture is concentrated in vacuo to give a residue. The residue is triturated with methanol (10 mL) at ambient temperature for 10 min. The resulting mixture is filtered to give the titular product (Example 81; 14 mg, 0.0398 mmol, 31.14%). ES/MS (m/z) (M+H) 339.3. $^1$H NMR (400.15 MHz, d6-DMSO): 12.27 (s, 1H), 8.96 (s, 1H), 7.75 (d, J=7.6 Hz, 2H), 7.69-7.65 (m, 2H), 7.47 (dd, J=2.9, 9.3 Hz, 1H), 7.40 (t, J=7.9 Hz, 2H), 7.14 (t, J=7.4 Hz, 1H), 4.10 (t, J=4.9 Hz, 2H), 3.80-3.76 (m, 5H).

The following Examples in Table 7 are synthesized essentially as described for 6-(2-hydroxyethoxy)-1-methyl-2-oxo-N-phenyl-quinoline-3-carboxamide (Example 58) using the appropriate starting material and reagents.

TABLE 7

Examples 59-61

| Ex. | Chemical Name | Structure | ES/MS (m/z) (M + H) |
|---|---|---|---|
| 59 | 6-(2-Hydroxyethoxy)-1-methyl-2-oxo-N-(2-pyridyl)quinoline-3-carboxamide | 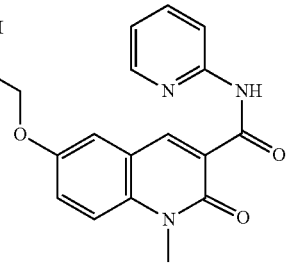 | 340.3 |
| 60 | 5-(2-Hydroxyethoxy)-1-methyl-2-oxo-N-phenyl-quinoline-3-carboxamide | 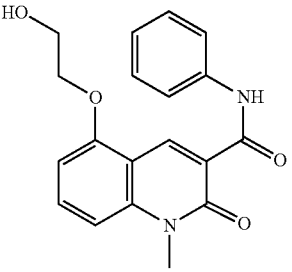 | 339.3 |
| 61 | 7-(2-Hydroxyethoxy)-1-methyl-2-oxo-N-phenyl-quinoline-3-carboxamide | 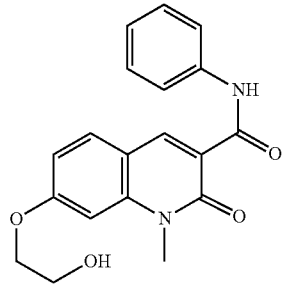 | 339.3 |

Example 62

6-(2-Hydroxyethylamino)-1-methyl-2-oxo-N-phenyl-quinoline-3-carboxamide

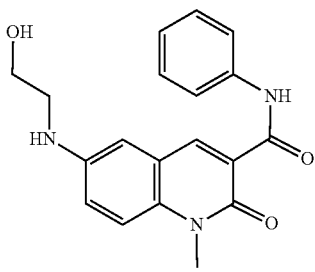

6-[2-[tert-Butyl(dimethyl)silyl]oxyethylamino]-1-methyl-2-oxo-N-phenyl-quinoline-3-carboxamide (140 mg, 0.275 mmol) is dissolved in THF (1.5 mL). 1 M tetrabutylammonium fluoride in THF (0.38 mL) at 0° C. is added slowly. The reaction is warmed to ambient temperature and stirred for 2 hrs. The reaction is poured into saturated aqueous ammonium chloride (30 mL) and stirred at ambient temperature for 10 min. The resulting mixture is extracted with ethyl acetate (30 mL×3). The organic layers are combined, washed with saturated aqueous ammonium chloride (30 mL×3), dried over anhydrous sodium sulfate, filtered, and concentrated in vacuo to give a residue. The residue is purified to give the titular product (10 mg, 0.0288 mmol, 10.45%) ES/MS (m/z) (M+H) 338.1. $^1$H NMR (400.14 MHz, CDCl$_3$): 12.33-12.29 (m, 1H), 8.92 (s, 1H), 7.84-7.81 (m, 2H), 7.41-7.31 (m, 3H), 7.18-7.12 (m, 2H), 6.97-6.95 (m, 1H), 4.28-4.26 (m, 1H), 4.01-3.93 (m, 2H), 3.84 (s, 3H), 3.43-3.37 (m, 2H), 1.76-1.74 (m, 1H).

The following Examples in Table 8 are synthesized essentially as described for 6-(2-hydroxyethylamino)-1-methyl-2-oxo-N-phenyl-quinoline-3-carboxamide (Example 62) using the appropriate starting material and reagents.

TABLE 8

Examples 63-70

| Ex. | Chemical Name | Structure | ES/MS (m/z) (M + H) |
|---|---|---|---|
| 63 | 5-(2-Hydroxyethylamino)-1-methyl-2-oxo-N-phenyl-quinoline-3-carboxamide | | 338.1 |
| 64 | N-(5-Fluorothiazol-2-yl)-5-(2-hydroxyethylamino)-1-methyl-2-oxo-quinoline-3-carboxamide | | 363.3 |
| 65 | 5-(2-Hydroxyethylamino)-1-methyl-2-oxo-N-(2-pyridyl)quinoline-3-carboxamide | | 339.3 |

TABLE 8-continued

Examples 63-70

| Ex. | Chemical Name | Structure | ES/MS (m/z) (M + H) |
|---|---|---|---|
| 66 | N-(5-Fluoro-2-pyridyl)-6-(2-hydroxyethylamino)-1-methyl-2-oxo-quinoline-3-carboxamide | | 357.3 |
| 67 | N-(5-Fluoro-2-pyridyl)-5-(2-hydroxyethylamino)-1-methyl-2-oxo-quinoline-3-carboxamide | | 357.3 |
| 68 | N-(5-Fluoropyrimidin-2-yl)-5-(2-hydroxyethylamino)-1-methyl-2-oxo-quinoline-3-carboxamide | | 358.1 |
| 69 | 5-(2-Hydroxyethylamino)-1-methyl-2-oxo-N-[5-(trifluoromethyl)pyrimidin-2-yl]quinoline-3-carboxamide | | 408.3 |
| 70 | 7-(2-Hydroxyethylamino)-1-methyl-2-oxo-N-phenyl-quinoline-3-carboxamide | | 338.4 | hAHR Nuclear Translocation Assay

Stable cell lines were established using Jump-In™ T-REx™ HEK293 Retargeting Kit (Life Technologies). Human AHR cDNA was cloned into the pJTI R4 CMV-TO EGFP vector. The EGFP was cloned to the C-terminal of AHR to form AhR-EGFP chimera. The pJTI R4 CMV-TO AhR-EGFP vector was transfected using FuGENE® HD into Jump-In™ T-REx™ HEK293 cells. Transfected cells were selected using 2.5 mg/ml G418 for 10 to 14 days, then expanded, harvested, and suspended in freeze media (FBS with 8% DMSO) at $2 \times 10^7$ cells/ml, and aliquots were stored in liquid nitrogen. One day before the assay date, cells were thawed and resuspended in DMEM with 5% FBS in the presence of 1 µg/ml Doxycycline and plated into ploy-L-Lysine coated CELLCARRIER-384 ULTRA Microplates (Perkin Elmer) at 12,000 to 15,000 cells per well and incubated at 37° C. and 5% $CO_2$ overnight. On the assay date, compound was serially diluted (1:2) into 384-well nunc plates with DMSO using acoustic dispensing (ECHO). The dose response was a 20-point curve. Compound was resuspended in 40 µl of DMEM plus 0.1% BSA. The culture media was damped and 25 µl of DMEM plus 0.1% BSA was added, then 25 µl of compound in DMEM plus 0.1% BSA was added into cell plates. Cells were incubated with compounds at 37° C. and 5% $CO_2$ for 45 minutes. The final DMSO concentration was 0.2%. The media was damped after 45 minutes of incubation. The cells were fixed with 40 µl of cold methanol (−20° C.) for 20 minutes. The methanol was damped and 50 µl of DPBS containing 1 µg/ml Hochst was added into the cell plates. The intensity of EGFP was quantitated by using OPERA PHENIX® or Operetta™ high content image system (Perkin Elmer) with 20× Water Objective and five field per well. The ratio of EGFP fluorescent intensity in nuclear over cytosol was analyzed using a 4-parameter nonlinear logistic equation to determine the potency of AHR agonists.

Table 9 shows the hAHR nuclear translocation assay $EC_{50}$ values for the exemplified compounds.

TABLE 9 hAHR Nuclear Translocation Assay $EC_{50}$ Values

| Example | $EC_{50}$ (nM) |
|---|---|
| 1 | 0.304 |
| 2 | 2.41 |
| 3 | 0.837 |
| 4 | 0.214 |
| 5 | 0.0971 |
| 6 | 5.17 |
| 7 | 6.13 |
| 8 | 1.12 |
| 9 | 0.613 |
| 10 | 0.669 |
| 11 | 3.50 |
| 12 | 6.89 |
| 13 | 3.72 |
| 14 | 0.993 |
| 15 | 14.2 |
| 16 | 1.09 |
| 17 | 2.37 |
| 18 | 0.468 |
| 19 | 25.8 |
| 20 | 0.675 |
| 21 | 10.8 |
| 22 | 0.389 |
| 23 | 0.601 |
| 24 | 7.36 |
| 25 | 2.57 |
| 26 | 0.701 |
| 27 | 10.6 |
| 28 | 1.91 |
| 29 | 0.570 |
| 30 | 0.511 |
| 31 | 53.2 |
| 32 | 16.4 |
| 33 | 1.33 |
| 34 | 9.04 |
| 35 | 2.29 |
| 36 | 0.832 |
| 37 | 0.807 |
| 38 | 6.34 |
| 39 | 3.52 |
| 40 | 0.831 |
| 41 | 6.24 |
| 42 | 3.96 |
| 43 | 11.5 |
| 44 | 0.595 |
| 45 | 2.14 |
| 46 | 2.21 |
| 47 | 18.0 |
| 48 | 21.3 |
| 49 | 9.00 |
| 50 | 26.8 |
| 51 | 16.4 |
| 52 | 20.3 |
| 53 | 16.2 |
| 54 | 18.3 |
| 55 | 40.6 |
| 56 | 79.2 |
| 57 | 62.8 |
| 58 | 7.45 |
| 59 | 19.2 |
| 60 | 1.40 |
| 61 | 16.1 |
| 62 | 6.00 |
| 63 | 1.91 |
| 64 | 52.9 |
| 65 | 6.69 |
| 66 | 53.9 |
| 67 | 1.92 |
| 68 | 81.2 |
| 69 | 6.66 |
| 70 | 15.1 |

The results of this assay demonstrate that the exemplified compounds are AHR agonists.

We claim:
1. A compound of the formula:

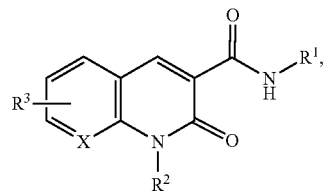

$R^1$ is selected from phenyl optionally substituted with 1-2 $R^i$, 5- to 6-membered heteroaryl optionally substituted with $R^k$ and $C_3$-$C_6$ cycloalkyl optionally substituted with $R^j$;

$R^i$ is independently selected from halogen, $C_1$-$C_4$ alkyl, $CF_3$, OH, O($C_1$-$C_4$ alkyl), O($C_1$-$C_3$)OCH$_3$ and NH($C_1$-$C_3$ alkyl)N(CH$_3$)$_2$;

$R^k$ is selected from halogen, $C_1$-$C_4$ alkyl, nitrile, $CF_3$ and O($C_1$-$C_4$ alkyl);

$R^j$ is O($C_1$-$C_4$ alkyl);

X is selected from N and —C(R⁴)—;

R² is $C_1$-$C_3$ alkyl, or together with R⁴ it forms a 5- to 6-membered heterocyclic fused ring;

R⁴ is hydrogen, halogen, NH($C_1$-$C_3$ alkyl)N(CH₃)₂, or together with R² it forms a 5- to 6-membered heterocyclic fused ring, and R³ is selected from $C_3$-$C_6$ cycloalkyl, NH($C_1$-$C_3$ alkyl), N($C_1$-$C_3$ alkyl)₂, NH($C_1$-$C_3$ alkyl)OH, NH($C_1$-$C_3$ alkyl)N($C_1$-$C_3$ alkyl)₂ and O($C_1$-$C_3$ alkyl)OH;

or a pharmaceutically acceptable salt thereof.

2. The compound according to claim 1, wherein R¹ is 5- to 6-membered heteroaryl optionally substituted with $R^k$, or a pharmaceutically acceptable salt thereof.

3. The compound according to claim 1, wherein R¹ is $C_3$-$C_6$ cycloalkyl optionally substituted with $R^j$, or a pharmaceutically acceptable salt thereof.

4. The compound according to claim 1, wherein X is CH, or a pharmaceutically acceptable salt thereof.

5. The compound according to claim 1, wherein R² is $C_1$-$C_3$ alkyl, or a pharmaceutically acceptable salt thereof.

6. The compound according to claim 1, wherein R² is CH₃, or a pharmaceutically acceptable salt thereof.

7. The compound according to claim 1, wherein R³ is selected from NH(CH₃), N(CH₃)₂, NH(CH₂CH₂)OH, NH(CH₂CH₂)N(CH₃)₂, and O(CH₂CH₂)OH.

8. The compound according to claim 1, wherein R³ is NH(CH₂CH₂)N(CH₃)₂.

9. The compound according to claim 1, which is:

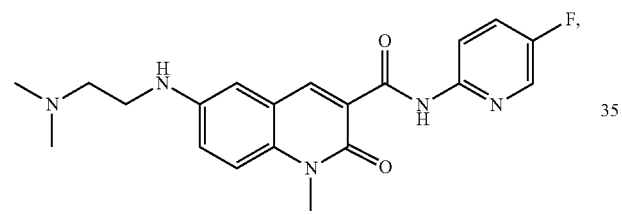

or a pharmaceutically acceptable salt thereof.

10. The compound according to claim 1, which is:

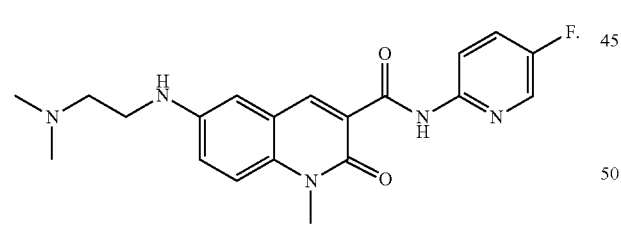

11. A pharmaceutical composition, comprising a compound or a pharmaceutically acceptable salt thereof according to claim 1 with one or more pharmaceutically acceptable carriers, diluents, or excipients.

12. A method of treating a disease or disorder selected from psoriasis, ulcerative colitis, Crohn's disease, graft-versus-host disease and multiple sclerosis in a patient, comprising administering to a patient in need of such treatment an effective amount of a compound according to claim 1 or a pharmaceutically acceptable salt thereof.

13. The method of claim 12, wherein the disease or disorder is psoriasis.

14. The method of claim 12, wherein the disease or disorder is ulcerative colitis.

15. The method of claim 12, wherein the disease or disorder is Crohn's disease.

16. The method of claim 12, wherein the disease or disorder is graft-versus-host disease.

17. The method of claim 12, wherein the disease or disorder is multiple sclerosis.

18. A compound, selected from:

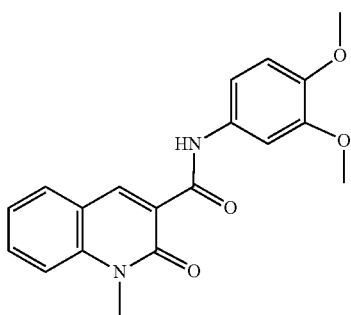

3

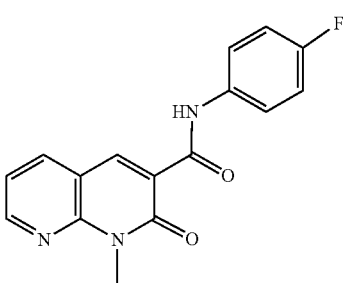

18

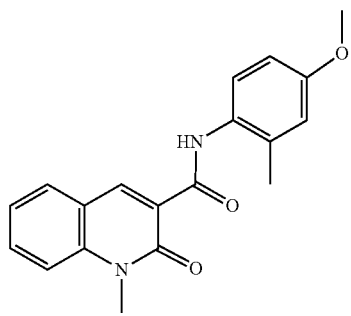

6

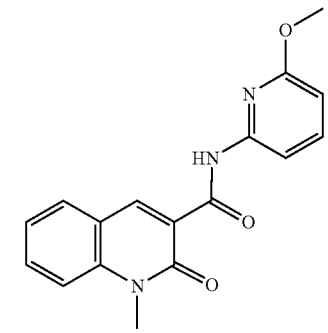

21

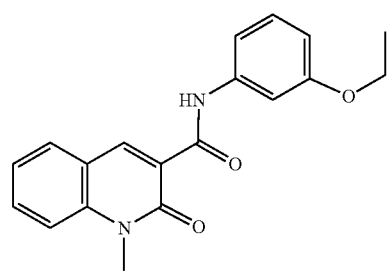
10
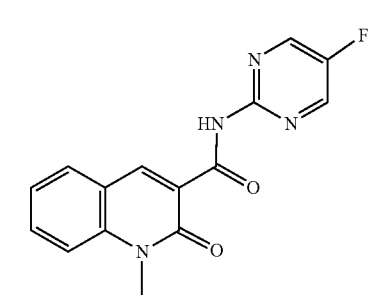
22
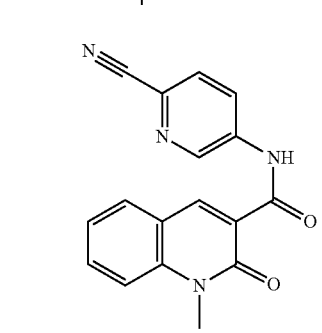
24
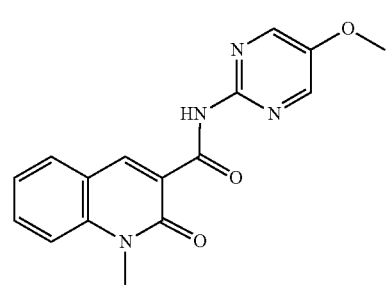
15
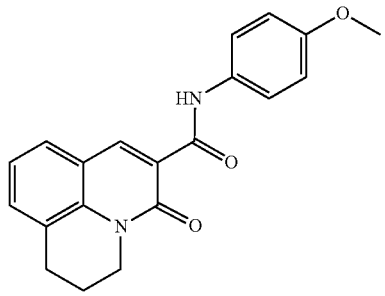
25
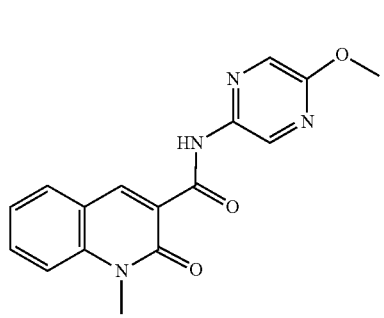
16
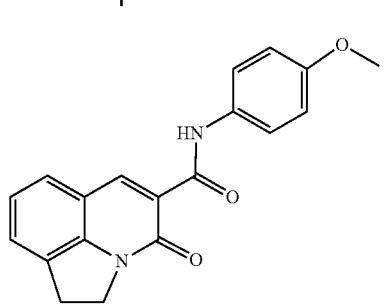
26
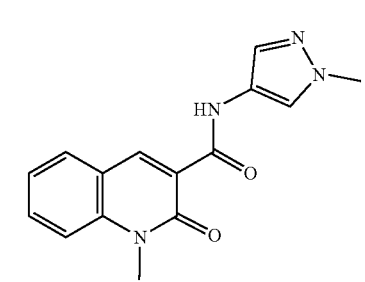
27
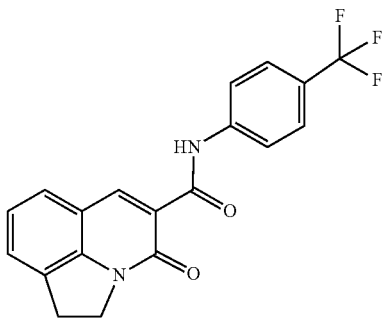
33

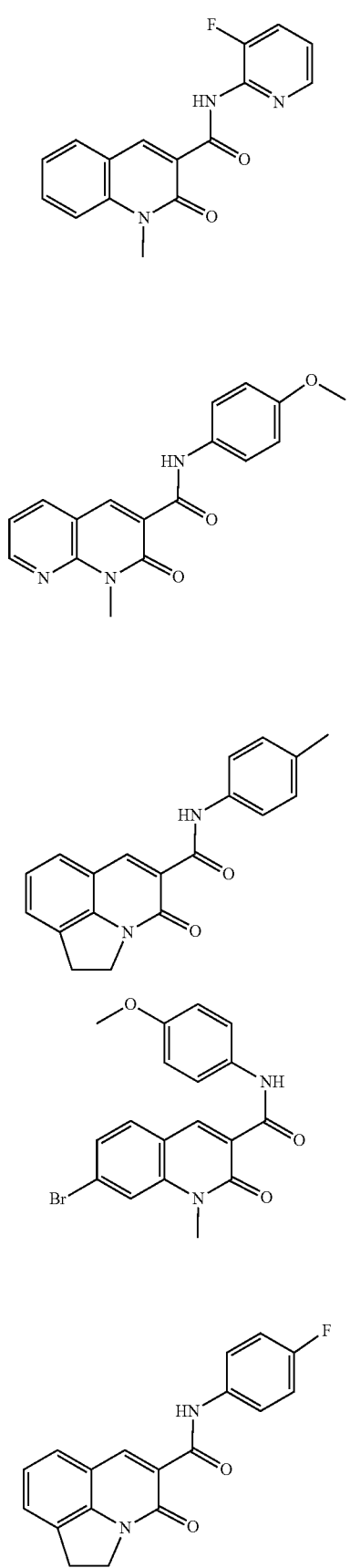
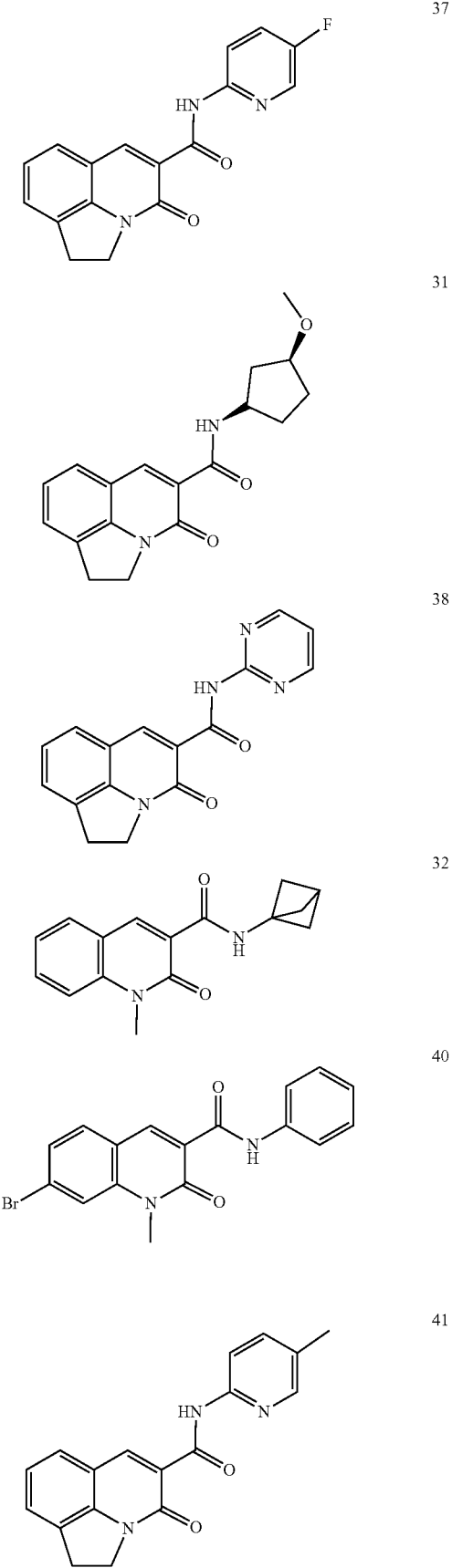

48
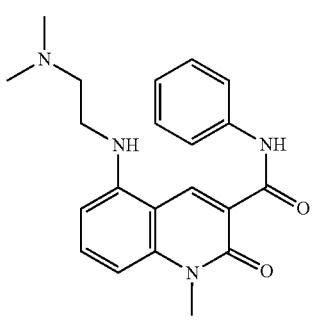 [SMILES: CN(C)CCNc1cccc2c1cc(C(=O)Nc1ccccc1)c(=O)n2C]
42
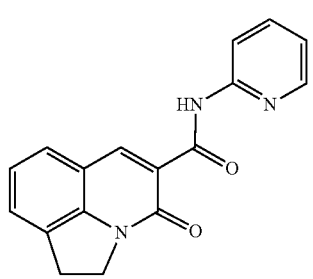
49
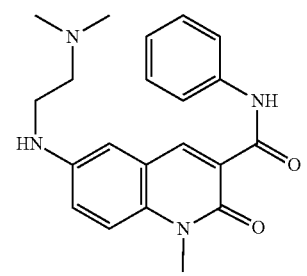 [SMILES: CN(C)CCNc1ccc2c(c1)cc(C(=O)Nc1ccccc1)c(=O)n2C]
44
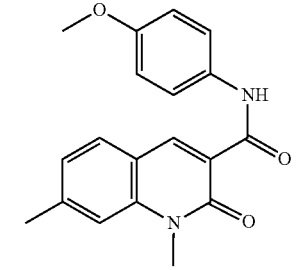
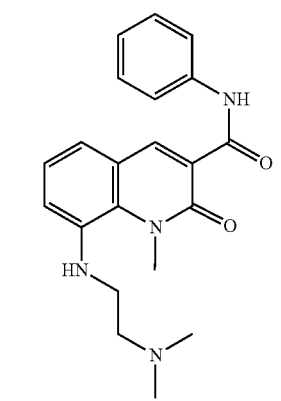 [SMILES: CN(C)CCNc1cccc2cc(C(=O)Nc3ccccc3)c(=O)n(C)c12]
45
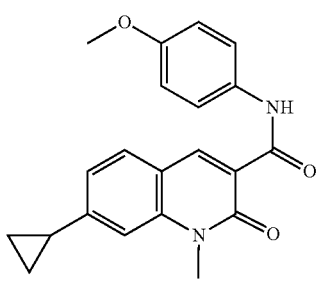
51
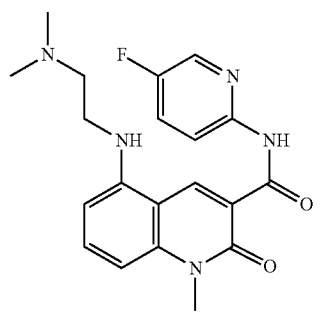 [SMILES: CN(C)CCNc1cccc2c1cc(C(=O)Nc1ccc(F)cn1)c(=O)n2C]
46
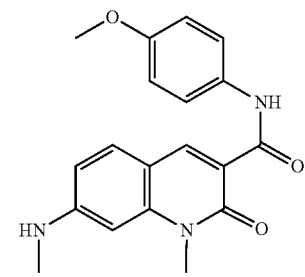
52
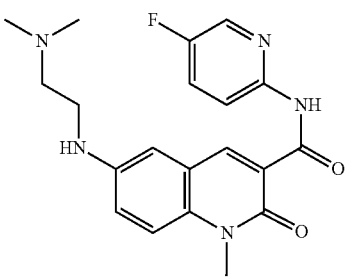 [SMILES: CN(C)CCNc1ccc2c(c1)cc(C(=O)Nc1ccc(F)cn1)c(=O)n2C]
47
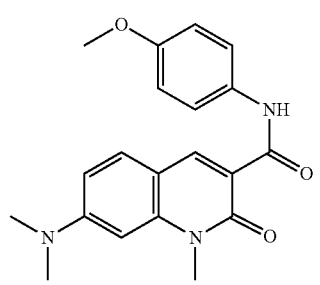

53
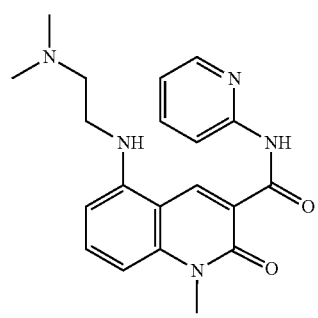 [SMILES: CN(C)CCNc1cccc2c1cc(C(=O)Nc1ccccn1)c(=O)n2C]
54
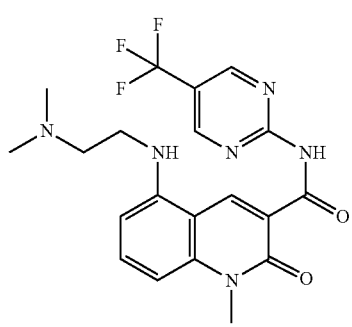 [SMILES: CN(C)CCNc1cccc2c1cc(C(=O)Nc1ncc(C(F)(F)F)cn1)c(=O)n2C]
60
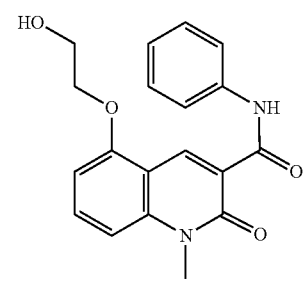 [SMILES: Cn1c(=O)c(C(=O)Nc2ccccc2)cc2c(OCCO)cccc21]
55
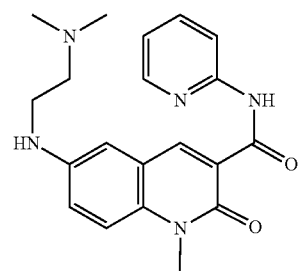
61
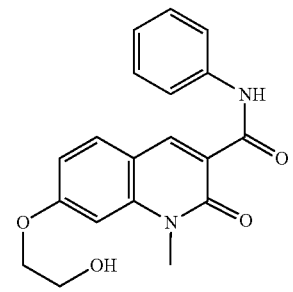 [SMILES: Cn1c(=O)c(C(=O)Nc2ccccc2)cc2ccc(OCCO)cc21]
56
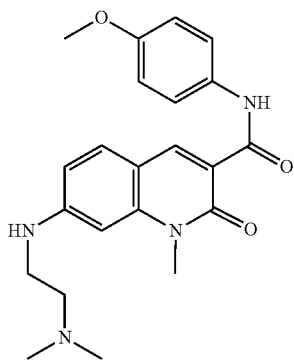
62
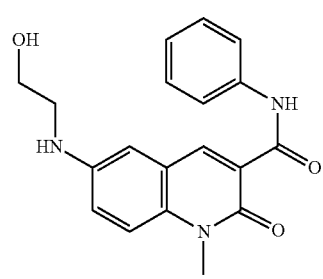 [SMILES: Cn1c(=O)c(C(=O)Nc2ccccc2)cc2cc(NCCO)ccc21]
57
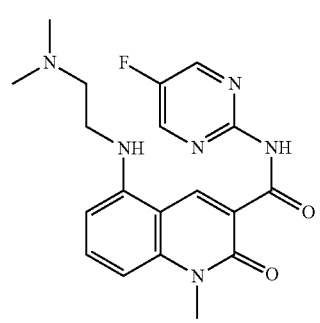
63
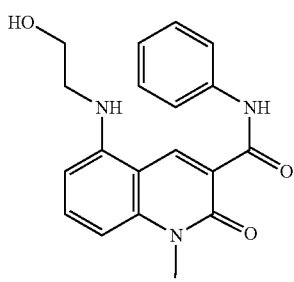 [SMILES: Cn1c(=O)c(C(=O)Nc2ccccc2)cc2c(NCCO)cccc21]
58
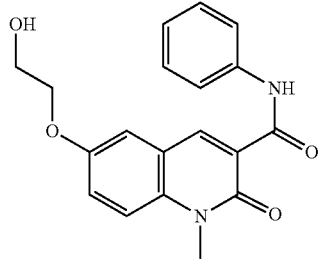

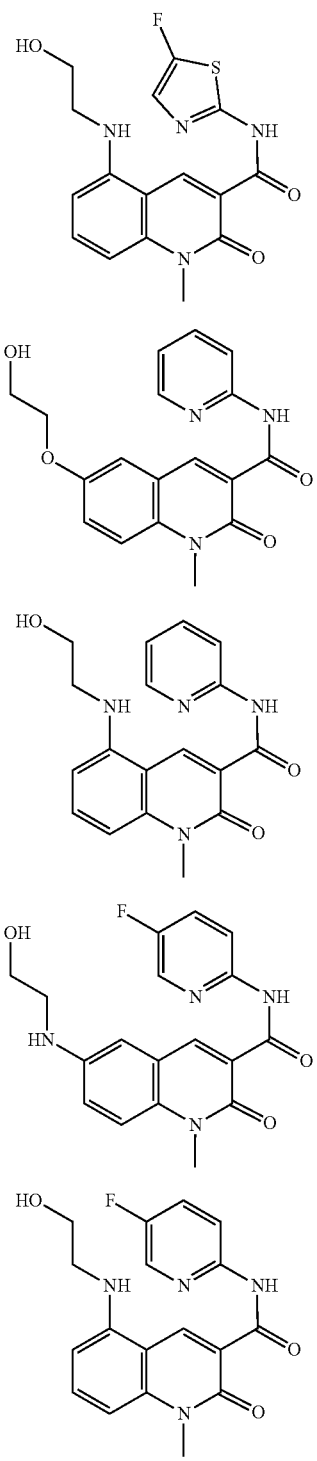

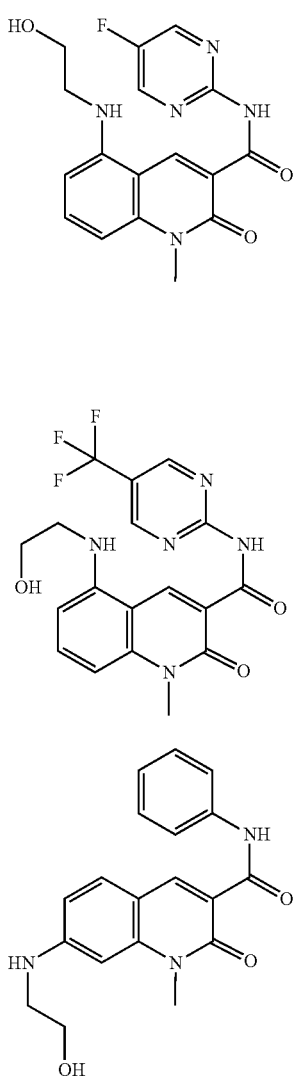

or a pharmaceutically acceptable salt thereof.

19. A pharmaceutical composition, comprising a compound or a pharmaceutically acceptable salt thereof according to claim 18 with one or more pharmaceutically acceptable carriers, diluents, or excipients.

20. A method of treating a disease or disorder selected from psoriasis, ulcerative colitis, Crohn's disease, graft-versus-host disease and multiple sclerosis in a patient, comprising administering to a patient in need of such treatment an effective amount of a compound according to claim 18 or a pharmaceutically acceptable salt thereof.

* * * * *